(12) United States Patent
Dodoc

(10) Patent No.: US 11,143,848 B2
(45) Date of Patent: Oct. 12, 2021

(54) FIXED FOCAL LENGTH OBJECTIVE LENS

(71) Applicant: Ernst Leitz Wetzlar GmbH, Wetzlar (DE)

(72) Inventor: Aurelian Dodoc, Wetzlar (DE)

(73) Assignee: Austrian Capital Management GmbH, Salzburg (AT)

( * ) Notice: Subject to any disclaimer, the term of this patent is extended or adjusted under 35 U.S.C. 154(b) by 236 days.

(21) Appl. No.: 16/355,311

(22) Filed: Mar. 15, 2019

(65) Prior Publication Data

US 2019/0310449 A1    Oct. 10, 2019

(30) Foreign Application Priority Data

Mar. 16, 2018    (DE) .......................... 102018106236.2

(51) Int. Cl.

| | |
|---|---|
| *G02B 13/00* | (2006.01) |
| *G02B 13/18* | (2006.01) |
| *G02B 7/04* | (2021.01) |
| *G02B 3/04* | (2006.01) |
| *G02B 15/177* | (2006.01) |

(Continued)

(52) U.S. Cl.
CPC ............... *G02B 13/18* (2013.01); *G02B 7/04* (2013.01); *G02B 3/04* (2013.01); *G02B 5/005* (2013.01); *G02B 9/00* (2013.01); *G02B 9/04* (2013.01); *G02B 9/10* (2013.01); *G02B 9/64* (2013.01); *G02B 13/002* (2013.01); *G02B 13/04* (2013.01); *G02B 15/177* (2013.01); *G02B 23/243* (2013.01)

(58) Field of Classification Search
CPC .......... G02B 9/64; G02B 13/18; G02B 13/04; G02B 5/005; G02B 3/04; G02B 13/002; G02B 23/243; G02B 15/177; G02B 9/00; G02B 7/04; G02B 9/04; G02B 9/10
USPC ....... 359/708, 716, 717, 739, 740, 749, 753, 359/754
See application file for complete search history.

(56) References Cited

U.S. PATENT DOCUMENTS

| | | | |
|---|---|---|---|
| 7,446,944 B2 | 11/2008 | Klein et al. | |
| 7,957,069 B2 * | 6/2011 | Dodoc | ................ G03F 7/70241 359/650 |

(Continued)

FOREIGN PATENT DOCUMENTS

| | | | | |
|---|---|---|---|---|
| DE | 30 36 070 A1 * | 9/1980 | ............. | G02B 15/14 |
| DE | 102015120219 A1 | 5/2016 | | |
| DE | 102017203673 A1 | 9/2017 | | |

*Primary Examiner* — Evelyn A Lester
(74) *Attorney, Agent, or Firm* — Steven M. Shape; Dennemeyer & Associates, LLC

(57) ABSTRACT

The invention consists of a fixed focal length objective lens forming an image of an object with a plurality of lens elements and an aperture stop (114), wherein the aperture stop (114) defines an aperture stop proximity space (118) and at least one field proximity space (120, 122). The objective lens comprises at least three aspherical surfaces (124, 126, 128, 130) of a lens element. Either two aspherical surfaces (128, 130) are positioned in the aperture stop proximity space (118) and at least one aspherical surface (124, 126) is positioned in a field proximity space (120, 122). Or at least one aspherical surface (128, 130) is positioned in the aperture stop proximity space (118) and two aspherical surfaces (124, 126) are positioned in a field proximity space (120, 122). This distribution of aspherical surfaces provides for means of optimally correction aberrations leading to a very high level of aberration correction.

21 Claims, 14 Drawing Sheets

(51) Int. Cl.

| | |
|---|---|
| G02B 13/04 | (2006.01) |
| G02B 9/10 | (2006.01) |
| G02B 9/00 | (2006.01) |
| G02B 9/04 | (2006.01) |
| G02B 9/64 | (2006.01) |
| G02B 5/00 | (2006.01) |
| G02B 23/24 | (2006.01) |

(56) References Cited

U.S. PATENT DOCUMENTS

| | | | |
|---|---|---|---|
| 8,508,864 B2 | 8/2013 | Neil | |
| 8,665,537 B2 | 3/2014 | Roth et al. | |
| 2009/0080086 A1* | 3/2009 | Shafer | G03F 7/70241 |
| | | | 359/651 |
| 2010/0046091 A1* | 2/2010 | Neil | G02B 13/18 |
| | | | 359/717 |
| 2011/0102913 A1* | 5/2011 | Neil | G02B 13/18 |
| | | | 359/717 |
| 2013/0022345 A1* | 1/2013 | Dodoc | G02B 13/08 |
| | | | 359/668 |
| 2014/0043693 A1* | 2/2014 | Dodoc | G02B 15/177 |
| | | | 359/686 |
| 2015/0241658 A1* | 8/2015 | Tomioka | G02B 13/009 |
| | | | 359/684 |
| 2016/0370558 A1* | 12/2016 | Takato | G02B 13/006 |

\* cited by examiner

FIXED FOCAL LENGTH OBJECTIVE LENS

FIELD OF THE INVENTION

The present invention relates to a fixed focal length objective lens (also called prime lens) used for photography or cinematography. More particularly, the present invention relates to a fixed focal length objective lens with a very high level of aberration correction and which can be used for a large field of view and a high numerical aperture, particularly for full frame image sensors.

BACKGROUND

There are five major types of monochromatic aberrations affecting the image: field curvature, spherical aberration, coma, astigmatism and distortion.

The correction of field curvature is typically the most important correction since, in the most general case, the image should be on a flat sensor surface. In an optical system including only refractive lens elements, the correction of field curvature can be accomplished by two methods: firstly, spatially separating negative powered groups of lenses from positive powered groups of lenses and secondly using different indices of refraction for different lenses.

Doublets and aspherical lens elements are used to correct all other aberrations.

DESCRIPTION OF RELATED ART

Objective lenses having a fixed focal length are widely used in photography and cinematography for capturing an image of an object.

U.S. Pat. No. 7,446,944 B2 discloses objective lenses having a plurality of optical elements including two moving lens groups for focusing and an aspherical lens element.

U.S. Pat. No. 8,508,864 B2 also discloses objective lenses for cinematography having a plurality of optical elements arranged into two positive groups and also aspherical lens elements and moving groups for focusing.

Both mentioned documents disclose objective lenses having correction means adapted to a small field of view and high aperture.

The document I. Neil: "High performance wide angle objective lens systems with internal focusing optics and multiple aspheric surfaces for the visible waveband", SPIE VOL 2774, p. 216-242, describes lenses used for wide angle applications having a plurality of aspherical surfaces.

The lenses disclosed in the above-described references do not provide substantially improved solutions for correcting the image aberrations related to a large image field and a high numerical aperture.

BRIEF SUMMARY OF THE INVENTION

It is, therefore, an object of the present invention to provide a fixed focal length objective lens for full frame image sensors with very high aberration correction. The aberration correction should be such that the modulation transfer function (MTF) is app. 50%, preferably 60% or higher, at 40 lpm and maximum image field height. This will make the objective lens suitable for 8 k image chips. Additionally, the objective lens should cover a large field of view and offer a high numerical aperture.

This aim is achieved by example embodiments as claimed in the independent claim. Additional advantageous embodiments are claimed in the dependent claims.

Described below are example embodiments of a fixed focal length objective lens forming an image of an object comprising a plurality of lens elements and an aperture stop. The aperture stop defines an aperture stop proximity space and at least one field proximity space. Typically, there are two field proximity spaces containing lenses, one on the object side and the other at the image side. The objective lens comprises at least three aspherical surfaces each on any of the lenses. The aspherical surfaces are distributed in the following way: Either two aspherical surfaces are in the aperture stop proximity space and at least one aspherical surface is in a field proximity space. Or at least one aspherical surface is in the aperture stop proximity space and two aspherical surfaces are in a field proximity space.

The two aspherical surfaces in a field proximity space are either both in the same field proximity space, or they are each in one field proximity space, one on the object side of the objective lens and one on the image side.

Two aspherical surfaces can be either on different lenses or on the same lens.

The use of three aspheres allows the correction of aberrations without using supplementary glass material so that glass weight could be controlled.

The aspheres are positioned where they have the highest effect on aberrations, i.e. either in the field proximity space or in the aperture stop proximity space. In this way four main aberrations are corrected: spherical aberration, coma, astigmatism and distortion.

The use of two aspheres in the same space allows a selective correction effect on higher order aberrations. For example, since the first aspherical term is influencing third order aberrations, an opposite contribution of the two aspheres could cause a reduced effect on this order of aberration, maintaining the large effect on the 5th and higher order aberrations.

All lens elements/surfaces situated in the aperture stop proximity space have a substantial effect on spherical aberration since the third order spherical aberration coefficient of a particular surface varies with the fourth power of the axial marginal ray height $H_M$ at the surface.

Furthermore, all lens elements/surfaces situated in the aperture stop proximity space have an increased effect on coma aberration, since the third order coefficient of coma aberration of a particular surface varies with the third power of the marginal ray height $H_M$ at the surface and the first power of the chief ray height Ho at the surface.

Also, optical elements/surfaces positioned in a field proximity space have an increased effect on distortion, since distortion varies with the third power of the chief ray height Ho and the first power of the axial marginal ray height on the surface. They also have an increased effect on astigmatism, since the third order coefficient of astigmatism varies with the second power of the marginal ray height and the second power of the chief ray height on the surface. The greatest effect on some of the monochromatic aberrations can be achieved if the aspherical surfaces in the field proximity space are placed where the ratio $H_C/H_M$ is larger than 2.5.

If the ratio $H_C/H_M$ is larger than 4 for at least one aspherical surface in the field proximity space, the effect on distortion may be substantial. Basically, the same applies for the aspherical surfaces in the aperture stop proximity space. If the ratio $H_C/H_M$ is smaller than 0.4 at the position of the at least one aspherical surface in the aperture stop proximity space, an excellent correction of coma and spherical aberration can be achieved.

The objective lens has a fixed first lens group of negative refracting power at the object side. This provides for sufficient compactness and will not alter the length of the objective lens when focusing, which can be an issue if space is restricted.

The objective lens further has a second lens group of positive refracting power following the first lens group in this order coming from the object side. It is, thus, a retrofocus objective lens.

The aperture stop is located in the positive lens group.

For optimal focusing the positive lens group comprises at least two sub lens groups.

Thus, the present invention relates to objective lenses having a first lens group of negative refracting power and a second lens group of positive refracting power and an iris stop located in the positive lens group, each of the lens groups comprising at least one aspherical lens element and the positive lens group comprising at least two moving optical elements for focusing at different object positions.

Example embodiments described herein include optimal arrangements of optical group structure and correction means within the optical system used for wide angle applications. These types of configurations may provide an optimal correction of aberration even in a compact sized objective lens.

Example embodiments disclosed in this specification may result in high performance objective lenses. A lens system is considered to be high performance lenses if the MTF (Modulation Transfer Function) has a value of at least 70% on axial field and at least 50% at all other field points calculated at a spatial frequency of 20 line pairs/mm. These values may be frequently exceeded by examples of the objective lenses described herein.

It has been shown to be advantageous for the first lens element of the second lens group to be moving for focusing.

Thereby, the change of those aberrations that depend on the chief ray height, such as astigmatism and distortion, with the change of object position, can be corrected efficiently.

It may be possible to achieve a substantial chromatic aberration correction if a Glass anomalous ratio (GAR) of between 125<GAR<175 can be achieved. A substantial correction of chromatic aberration can be achieved when at least one abnormal glass of the type fluorite crown is used in positive powered lenses and special short flints (see KzFS in FIG. 14) (also called dense short flints) are used in negative powered lenses, when the lenses are positioned in the aperture stop proximity space. In the field proximity spaces low dispersion abnormal glasses are to be used for at least one lens in order to reduce the chromatic aberration contributions from these lenses.

If at least one of the two lens groups comprises two aspherical surfaces, a selective correction effect on higher order aberrations may be achieved. For example, since the first aspherical term affects third order aberrations, an opposite contribution of the two aspheres could cause a reduced effect on this order of aberration, maintaining the large effect on the 5th and higher order aberrations.

Preferably, the two aspherical surfaces within a lens group are located on two different lens elements, and the two different lens elements are positioned adjacent to one another. This increases the correction effect on aberrations and enables a selective correction effect on higher order aberrations.

If the first lens group having negative refractive power comprises at least two negative lens elements, then the necessary negative power of the lens group is distributed on at least two elements and the aberration contribution of these two elements is reduced accordingly, since the aberration contribution depends directly on the lens power. A large power lens will have a larger aberration contribution than a low power lens.

If the first lens elements include a meniscus shape oriented with the convex side toward the object, the aberration contribution of the surfaces will also be reduced since the incidence angle will have smaller values. At normal incidence, the ray is not deviated and so the surface will have no contribution on aberrations at all.

With two aspherical lens elements in the front lens group, a separation of specific aberration correction is achieved on at least two aberration types since one is mainly influencing one aberration for example distortion and the other is mainly affecting a second aberration for example astigmatism.

This can further be improved if the first and the second lens elements of the first group have each a first surface on the object side of aspherical shape.

If both front lens elements are of a meniscus type with the convex surface toward the object, both will have an optimal shape for aberration contribution since the incidence angle of the ray bundles starting from the field extremity will be reduced.

Configuring the first lens with an aspherical surface on the object side may optimize correction and manufacturability. An aspherical surface on a negative lens in the front group can reduce the power of the lens from the optical axis toward the lens margin. This allows for a reduced angle of incidence of the rays of the beam coming from the outmost object field and impinging on the surface; particularly when the first lens is of meniscus type with the convex side towards the object.

More aspheres will increase the correction means described above. The position of aspherical surfaces is critical for affecting specific aberrations.

BRIEF DESCRIPTION OF THE SEVERAL VIEWS OF THE DRAWINGS

Other objects and advantages of the present invention may be ascertained from a reading of the specification and appended claims in conjunction with the drawings therein. For a more complete understanding of the present invention, reference is established to the following description of embodiments made in connection with accompanying drawings. Possible solutions to the problem are not limited to the embodiments. The exemplary embodiments are shown schematically in the figures. The same reference numerals in the individual figures designate the same, or functionally identical, or with respect to their functions, corresponding elements. In detail:

Figure 1:
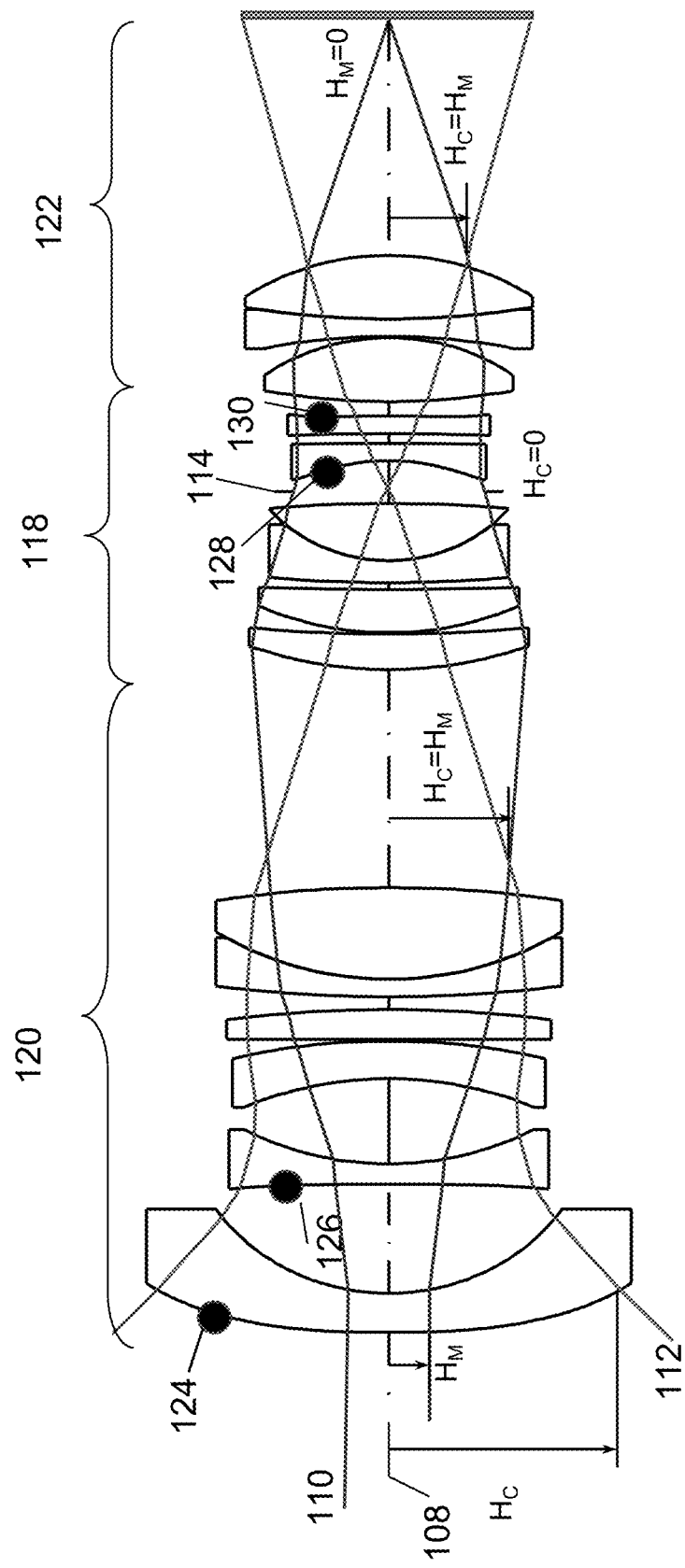
FIG. 1 shows an optical system according to the first embodiment and the position of the relevant rays within the lens system. It also indicates the preferred position of the aspherical elements.
Figure 5:
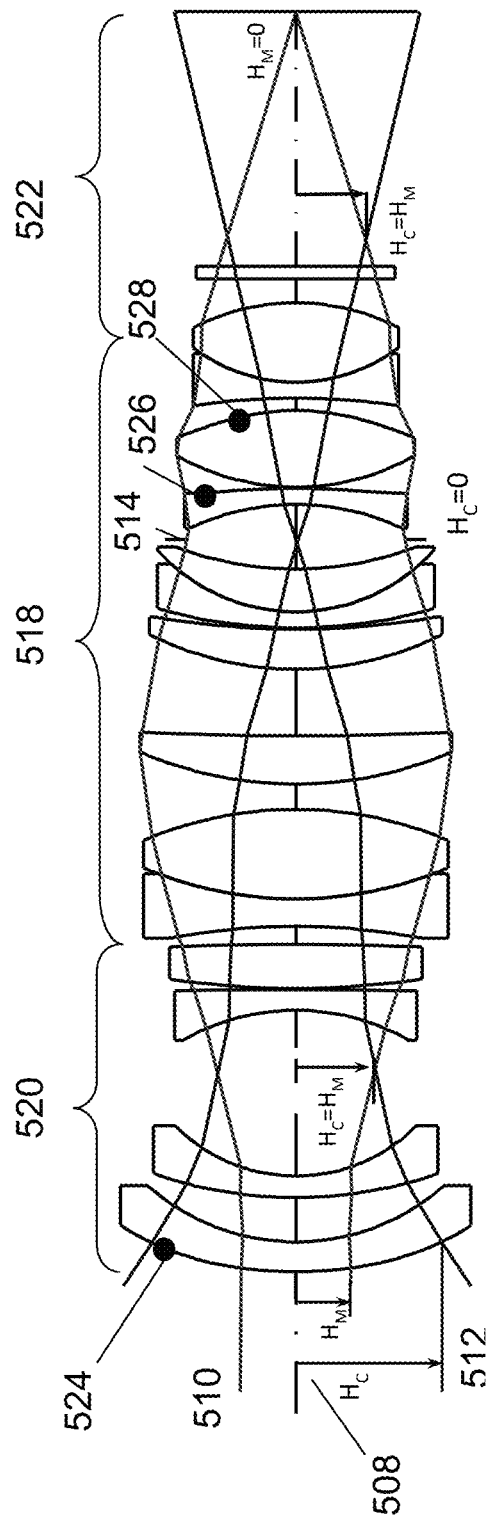
FIG. 5 shows a sectional view of a lens corresponding to the second embodiment including the reference rays and the position of the aspherical lens elements.
Figure 8:
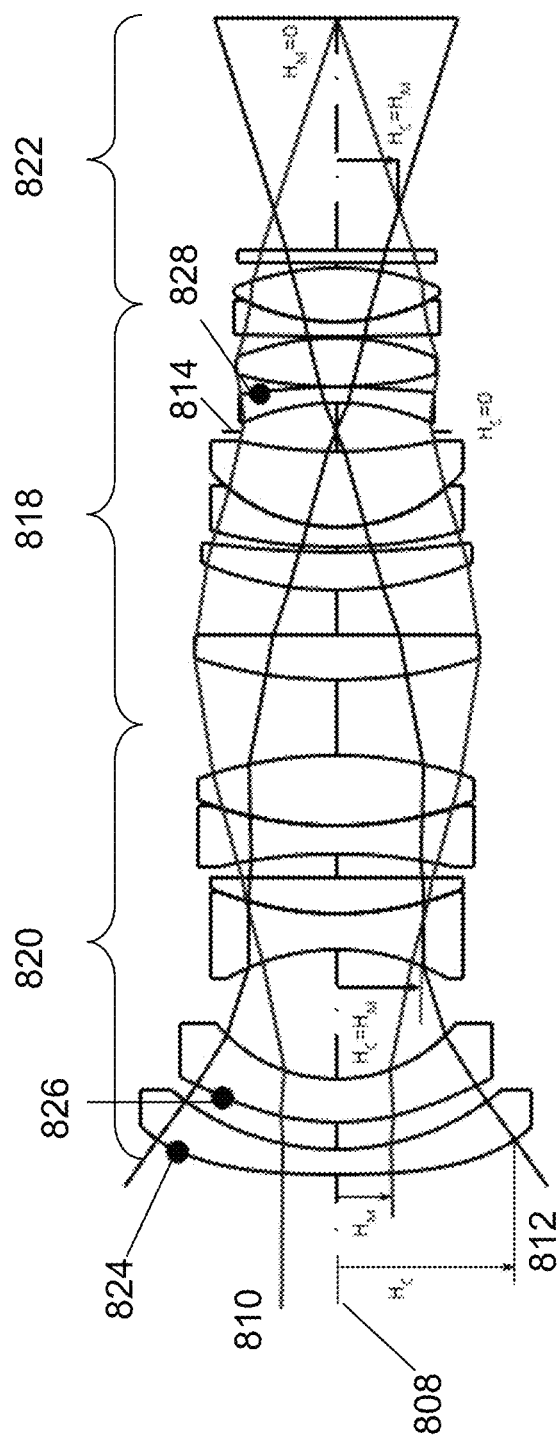
FIG. 8 shows a sectional view of a lens corresponding to the third embodiment including the reference rays and the position of the aspherical lens elements.
Figure 11:
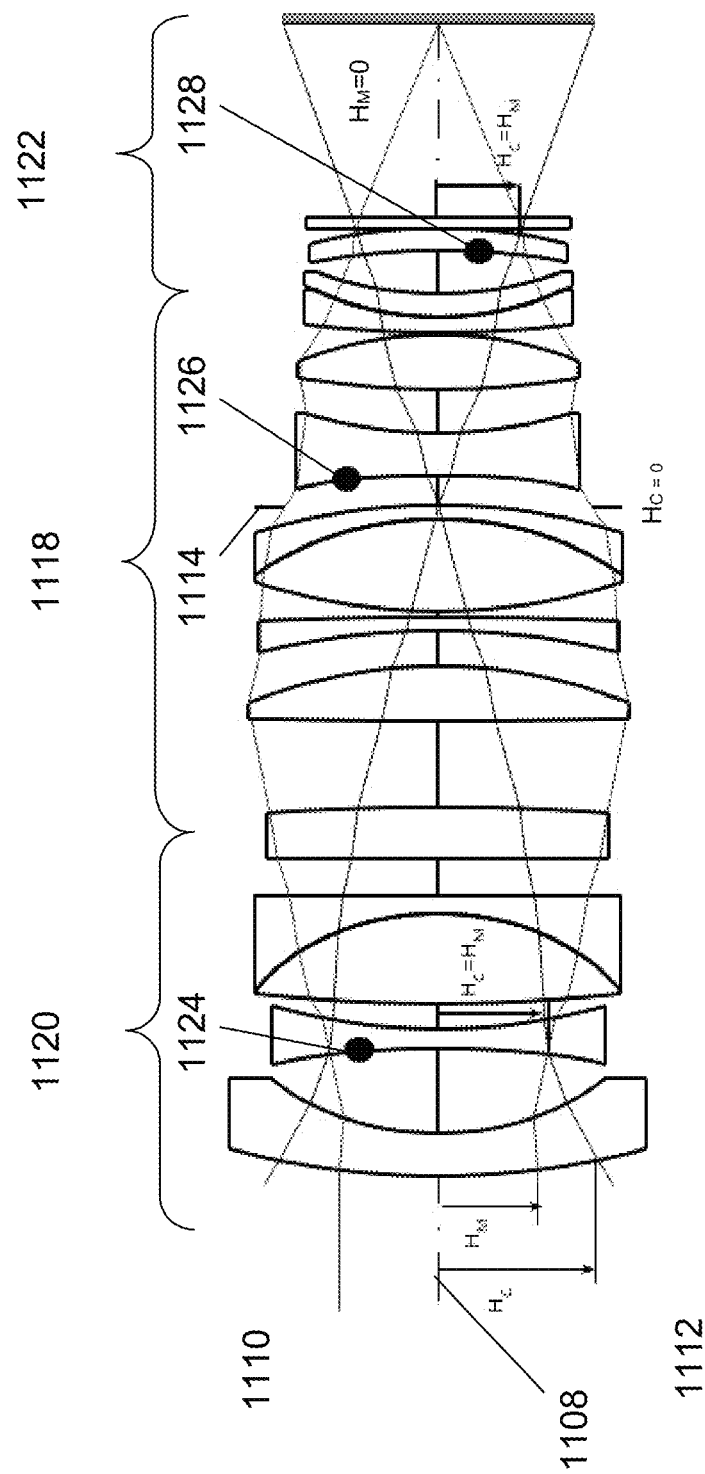
FIG. 11 shows a sectional view of a lens corresponding to the fourth embodiment including the reference rays and the position of the aspherical lens elements.

Tables:

Table 1 the optical powers of the individual lenses for the first embodiment;

Table 2 the form of the individual lenses for the first embodiment;

Table 3 the orientation of the individual lenses for the first embodiment;

Table 4 the glass type of the individual lenses for the first embodiment;

Table 5 the range of focal lengths of the individual lenses for the first embodiment;

Table 6A the numerical data corresponding to the embodiment of the objective lens in FIG. 1 (first embodiment);

Table 6B the aspherical constants of the aspheres of the embodiment of the objective lens in FIG. 1 (first embodiment);

Table 7 the influence of the different aspherical surfaces used in the objective lens in FIG. 1 (first embodiment) on different monochromatic aberrations;

Table 8 the optical powers of the individual lenses for the second embodiment;

Table 9 the form of the individual lenses for the second embodiment;

Table 10 the orientation of the individual lenses for the second embodiment;

Table 11 the glass type of the individual lenses for the second embodiment;

Table 12 the range of focal lengths of the individual lenses for the second embodiment;

Table 13A the numerical data corresponding to the embodiment of the objective lens in FIG. 5 (second embodiment);

Table 13B the aspherical constants of the aspheres of the embodiment of the objective lens in FIG. 5 (second embodiment);

Table 14 the influence of the different aspherical surfaces used in the objective lens in FIG. 5 (second embodiment) on different aberrations;

Table 15 the optical powers of the individual lenses for the third embodiment;

Table 16 the form of the individual lenses for the third embodiment;

Table 17 the orientation of the individual lenses for the third embodiment;

Table 18 the glass type of the individual lenses for the third embodiment;

Table 19 the range of focal lengths of the individual lenses for the third embodiment;

Table 20A the numerical data corresponding to the embodiment of the objective lens in FIG. 8 (third embodiment);

Table 20B the aspherical constants of the aspheres of the embodiment of the objective lens in FIG. 8 (third embodiment);

Table 21 the influence of the different aspherical surfaces used in the objective lens in FIG. 8 (third embodiment) on different aberrations;

Table 22 the optical powers of the individual lenses for the fourth embodiment;

Table 23 the form of the individual lenses for the fourth embodiment;

Table 24 the orientation of the individual lenses for the fourth embodiment;

Table 25 the glass type of the individual lenses for the fourth embodiment;

Table 26 the range of focal lengths of the individual lenses for the fourth embodiment;

Table 27A the numerical data corresponding to the embodiment of the objective lens in FIG. 11 (fourth embodiment);

Table 27B the aspherical constants of the aspheres of the embodiment of the objective lens in FIG. 11 (fourth embodiment); and Table 28 the influence of the different aspherical surfaces used in the objective lens in FIG. 11 (fourth embodiment) on different aberrations.

DETAILED DESCRIPTION OF THE INVENTION

First Embodiment

FIG. 1 shows a schematic view of the lens corresponding to a first embodiment where the lens is a prime lens with a fixed focal length of about 25 mm and an f-number of 1.7. A ray bundle starting from the object point on the left-hand side on the optical 108 axis is limited by the marginal rays 110. The ray bundle starting at the outmost visible object height is guided through the objective lens around the chief ray 112.

For a centered optical system, the plane formed by the optical axis 108 and the marginal ray 110 is called by convention the meridional plane. The chief ray 112 is also positioned in this meridional plane. The graphic representation of the lenses is typically done in the meridional plane, with sectioning of all the lens elements.

Referring to FIG. 1, the marginal ray 110 has at every intersection point with an optical surface a height $H_M$ (distance to the optical axis) and the chief ray 112 has a corresponding height $H_C$ (distance to the optical axis), so that for every surface position, a ratio, $H_C/H_M$, of the chief ray height and the marginal ray height can be calculated. Considering the axial symmetry of the lens and imagery, there are two positions where the ratio equals 1 and the chief ray 112 is intersecting the marginal ray 110. At the aperture stop 114, the chief ray height is zero. At the image position, the marginal ray height is zero. The space around the aperture stop at which $H_C/H_M<0.5$ is defined to be the aperture stop proximity space 118.

All lens elements/surfaces situated in this aperture stop proximity space 118 have an increased effect on spherical aberration since the third order spherical aberration coefficient of a particular surface (see e.g. Table 7) varies with the fourth power of the axial marginal ray height $H_M$ at the surface.

Furthermore, all lens elements/surfaces situated in the aperture stop proximity space 118 have an increased effect on coma aberration, since the third order coefficient of coma aberration of a particular surface (see e.g. Table 7) varies with the third power of the marginal ray height $H_M$ at the surface and the first power of the chief ray height $H_C$ at the surface. The space in front of the aperture stop proximity space 118 shall be referred to herein as an object side field proximity space 120. The space beyond the aperture stop proximity space 118 shall be referred to herein as an image side field proximity space 122.

Optical elements positioned in this space have an increased effect on distortion, since the third order surface contribution on distortion varies with the third power of the chief ray height at the relevant optical surface. Optical elements positioned in this space also have an increased effect on astigmatism, since the third order surface contribution on astigmatism varies with the second power of the marginal ray height and the second power of the chief ray height both on the relevant optical surface.

The first embodiment can be summarized as shown in Table 1.

TABLE 1

| Lens | Power |
|------|-------|
| L1*  | −     |
| L2*  | −     |
| L3   | −     |
| L4   | +     |
| L5   | −     |
| L6   | +     |
| L7   | +     |
| L8   | +     |
| L9   | −     |
| L10  | +     |
| Stop |       |
| L11* | −     |
| L12* | +     |
| L13  | +     |
| L14  | −     |
| L15  | +     |

The * denotes the aspheres. There are no other lens elements in this objective lens in this example implementation.

With this general setup, the major advantages of the invention can be achieved. The aspherical surfaces are preferably positioned as follows:

The first aspherical surface 124 is located on the object side surface of the first lens L1, i.e. in the object side field proximity space 120.
The second aspherical surface 126 is located on the object side surface of the second lens L2, i.e. also in the object side field proximity space 120.
The third aspherical surface 128 is located on the object side surface of lens L11, i.e. in the aperture stop proximity space 118.
The fourth aspherical surface 130 is located on the image side surface of lens L12, i.e. also in the aperture stop proximity space 118.

As explained above, at these positions, the above lenses have a very strong effect on correcting different aberrations.

An advantageous realization of the first embodiment may be implemented using lenses with the form indicated in Table 2.

TABLE 2

| Lens | Power | Form      |
|------|-------|-----------|
| L1*  | −     | meniscus  |
| L2*  | −     | biconcave |
| L3   | −     | meniscus  |
| L4   | +     | biconvex  |
| L5   | −     | meniscus  |
| L6   | +     | biconvex  |
| L7   | +     | meniscus  |
| L8   | +     | meniscus  |
| L9   | −     | meniscus  |
| L10  | +     | biconvex  |
| Stop |       |           |
| L11* | −     | meniscus  |
| L12* | +     | meniscus  |
| L13  | +     | biconvex  |
| L14  | −     | biconcave |
| L15  | +     | biconvex  |

Further advantages can be achieved by using the orientations of the lenses shown in Table 3.

TABLE 3

| Lens | Power | Form      | Orientation           |
|------|-------|-----------|-----------------------|
| L1*  | −     | meniscus  | convex towards object |
| L2*  | −     | biconcave |                       |
| L3   | −     | meniscus  | concave towards object|
| L4   | +     | biconvex  |                       |
| L5   | −     | meniscus  | convex towards object |
| L6   | +     | biconvex  |                       |
| L7   | +     | meniscus  | convex towards object |
| L8   | +     | meniscus  | convex towards object |
| L9   | −     | meniscus  | convex towards object |
| L10  | +     | biconvex  |                       |
| Stop |       |           |                       |
| L11* | −     | meniscus  | concave towards object|
| L12* | +     | meniscus  | concave towards object|
| L13  | +     | biconvex  |                       |
| L14  | −     | biconcave |                       |
| L15  | +     | biconvex  |                       |

Since the role of the lenses is to bundle the rays emerging from the object, thus forming the image, the shape of the lenses is optimally designed, since each lens has either a reduced incidence angle of the chief ray or a reduced incidence angle of the marginal ray. This enables a reduced contribution of each lens on image aberrations and also a reduced number of correction means.

Further advantages can be achieved by using lenses having the glass types shown in Table 4.

TABLE 4

| Lens | Power | Form      | Orientation            | glass type            |
|------|-------|-----------|------------------------|-----------------------|
| L1*  | −     | meniscus  | convex towards object  | phosphate crown       |
| L2*  | −     | biconcave |                        | lanthanum dense flint |
| L3   | −     | meniscus  | concave towards object | lanthanum crown       |
| L4   | +     | biconvex  |                        | barium dense flint    |
| L5   | −     | meniscus  | convex towards object  | dense flint           |
| L6   | +     | biconvex  |                        | lanthanum dense flint |
| L7   | +     | meniscus  | convex towards object  | dense flint           |

TABLE 4-continued

| Lens | Power | Form | Orientation | glass type |
|---|---|---|---|---|
| L8 | + | meniscus | convex towards object | phosphate crown |
| L9 | − | meniscus | convex towards object | barium dense flint |
| L10 Stop | + | biconvex | | phosphate crown |
| L11* | − | meniscus | concave towards object | flint |
| L12* | + | meniscus | concave towards object | lanthanum dense flint |
| L13 | + | biconvex | | dense phosphate crown |
| L14 | − | biconcave | | lanthanum dense flint |
| L15 | + | biconvex | | phosphate crown |

The definitions of the glass types are given in the glossary.

Lenses also contribute to chromatic aberrations since the glass index of refraction varies with wavelength. The selection of glass types is an important factor for correcting chromatic aberrations and chromatic variation of all monochromatic aberrations.

Since dispersion is the main property of a glass type in the context of aberration correction, there are two different ways of glass type classification.

First of all, glass materials can be classified according to the magnitude of their dispersion characterized with the principal dispersion or the Abbe number. So, a high dispersion glass has an Abbe number lower than 62 and a low dispersion glass has an Abbe number larger than 62.

Figure 14:
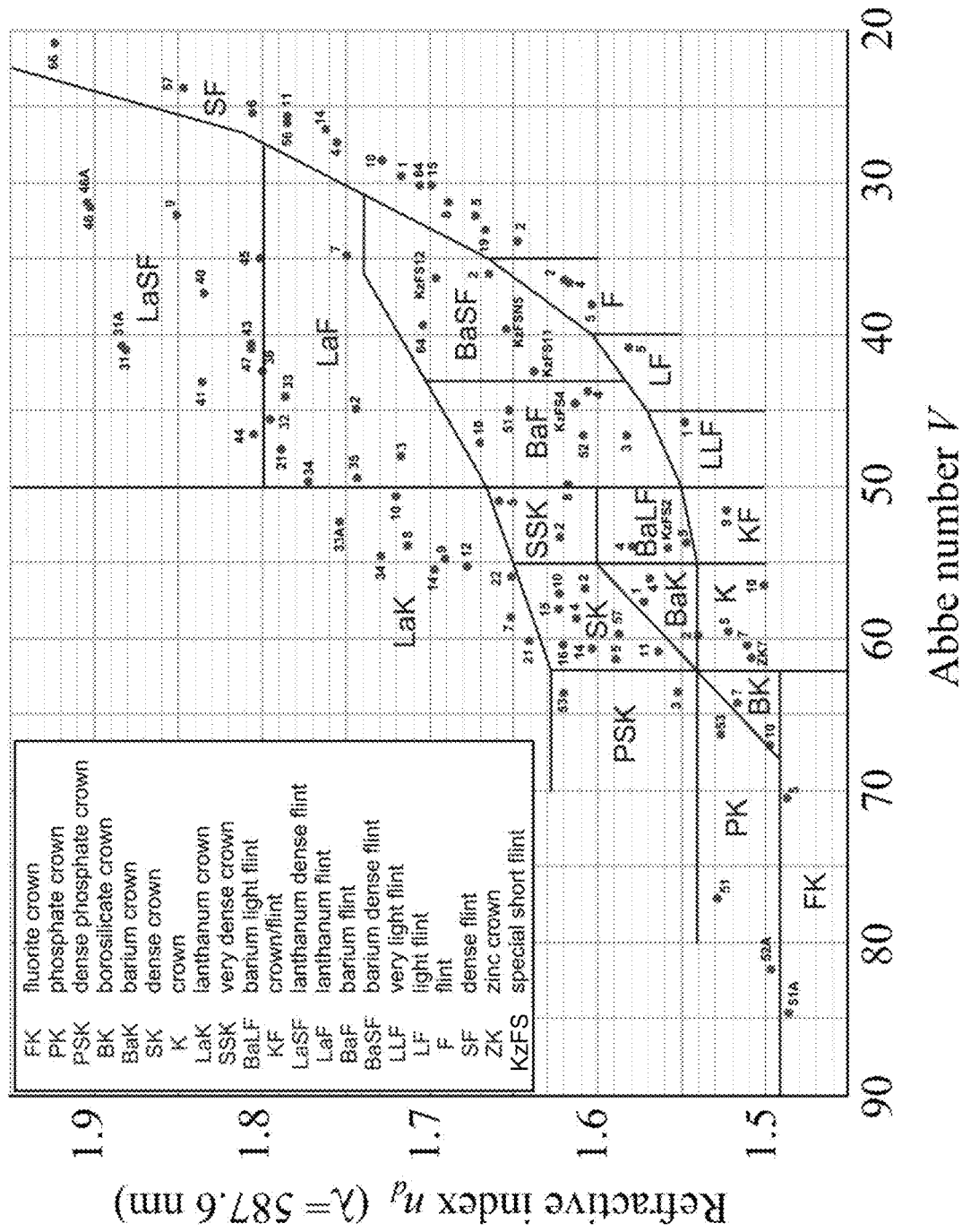
FIG. 14 shows the names of the glass material classes as a function of the refractive index and the Abbe number according to the Schott glass catalogue.

Secondly, glass materials can be classified according to the behavior of their dispersion in the short wavelength region. So, there are glasses with normal dispersion (most of them situated on a line through the glasses K7 and F2 from SHOTT AG in a diagram showing relative partial dispersion vs. Abbe number for a variety of glass formulations) and glasses with abnormal behavior (abnormal glasses). An example diagram showing relative partial dispersion vs. Abbe numbers for various glass formulations is shown in FIG. 14. The abnormal glasses can further be classified according to the magnitude of their relative partial dispersion in the short wavelength region of the spectrum. So, there are lenses with a high dispersion in the short wavelength spectrum, such as the fluorite crowns (e.g. FK51A from SHOTT or SFPL51 from OHARA) and glasses with a low dispersion in the short wavelength spectrum, such as the dense or special short flints (see KzFS in FIG. 14, e.g. NKZFS5 (also known as KzFSN5) from SHOTT or SNBH5 from OHARA). (Cf. also FIG. 4.)

Further advantages can be achieved by using the following ranges of focal lengths for the lenses:

TABLE 5

| Lens | Power | Form | Orientation | glass type | range of focal length |
|---|---|---|---|---|---|
| L1* | − | meniscus | convex towards object | phosphate crown | −73.22 ± 50% |
| L2* | − | biconcave | | lanthanum dense flint | −53.03 ± 50% |
| L3 | − | meniscus | concave towards object | lanthanum crown | −190.63 ± 50% |
| L4 | + | biconvex | | barium dense flint | 267.77 ± 50% |
| L5 | − | meniscus | convex towards object | dense flint | −82.73 ± 50% |
| L6 | + | biconvex | | lanthanum dense flint | 43.14 ± 50% |
| L7 | + | meniscus | convex towards object | dense flint | 101.25 ± 50% |
| L8 | + | meniscus | convex towards object | phosphate crown | 95.70 ± 50% |
| L9 | − | meniscus | convex towards object | barium dense flint | −38.90 ± 50% |
| L10 Stop | + | biconvex | | phosphate crown | 49.12 ± 50% |
| L11* | − | meniscus | concave towards object | flint | −43.09 ± 50% |
| L12* | + | meniscus | concave towards object | lanthanum dense flint | 214.08 ± 50% |
| L13 | + | biconvex | | dense phosphate crown | 41.78 ± 50% |
| L14 | − | biconcave | | lanthanum dense flint | −59.01 ± 50% |
| L15 | + | biconvex | | phosphate crown | 67.37 ± 50% |

The numerical data corresponding to this first embodiment is given in Table 6A. The exemplary glass types are shown by way of example only. The identifiers used for the glass types correspond to tradenames that are well-known to one skilled in the art. The glass types and corresponding tradenames are used by Schott AG, Mainz, Germany, or Ohara Corporation, Japan.

The aspherical constants for the aspheres 114 used in the first embodiment are shown in Table 6B.

Surface profiles of aspheric surfaces are governed by the following conventional equation:

$$z(r) = \frac{r^2}{R\left(1 + \sqrt{1 - (1+K)\frac{r^2}{R^2}}\right)} + C1r^4 + C2r^6 + C3r^8 + \ldots + C9r^{20}$$

where the optic axis is presumed to lie in the z direction, and $z(r)$ is the sag, i.e. the z-component of the displacement of the surface from the vertex (pole) of the surface, at distance r from the axis. The coefficients C1, C2, . . . describe the deviation of the surface from the axially symmetric quadric surface specified by R (the radius of curvature of the spherical surface) and K (the conic constant).

Referring to FIG. 1, the correction means used to correct the most important aberrations are positioned in the field proximity space 120 and the aperture stop proximity space 118. The first and the second optical elements have a first surface 1, 3 of aspherical shape. The aberration influence ratio $H_C/H_M$ is larger than 4 at the first aspherical surface 1 and larger than 2.5 at the second aspherical surface 3. Correspondingly, these two aspherical surfaces have a significant effect on distortion and astigmatism as shown in Table 7.

Table A common design principle for all embodiments of this invention is that there are no aspheres in doublet lenses, as these are very costly in production, requiring difficult centering of the lenses.

Figure 2:
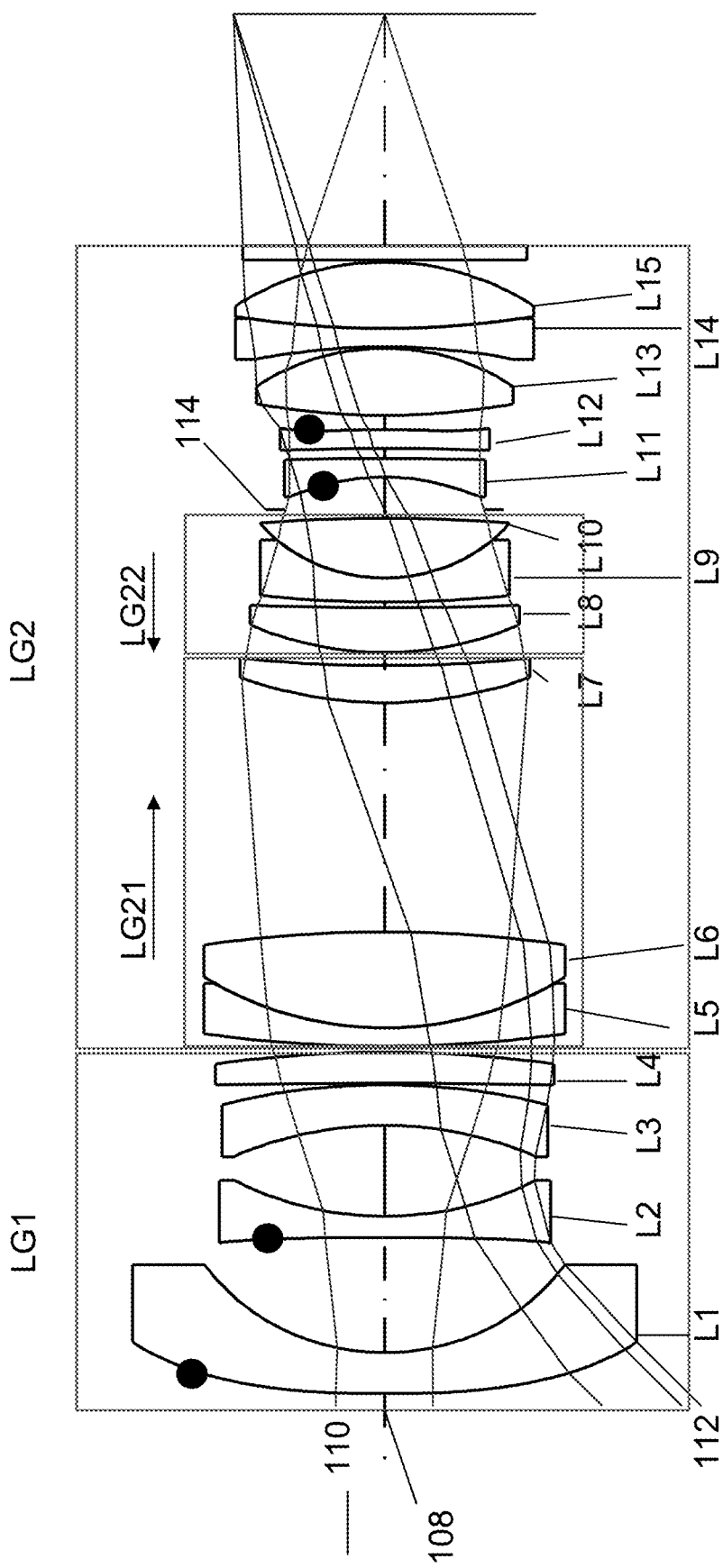
FIG. 2 shows the sectional view of the lens of FIG. 1, including the group structure, moving groups and aspheric lens positions.

Table 7 lists all third-order (Seidel) aberration contributions for the given surfaces as provided by CODEV optical design software. There are two contributions listed. The first is the spherical surface contribution, i.e. the contribution of a spherical lens. And the second, listed as second row only in case that the surface is aspherical, is the contribution of the aspherical shape. In addition, Table 7 indicates that the aspheric surfaces 21 and 24 positioned in the aperture stop proximity space 118 have the strongest influence on spherical aberration and coma (influence in bold type). FIG. 2 illustrates another representation of the optical lens system according to the first embodiment showing the axial and outmost off axis beams by three rays. The system comprises two main groups LG1, LG2 and the second group LG2 contains the aperture stop 114 and two independently moving lens groups LG21 and LG22 for focusing. The movement performed by these subgroups LG21 and LG22 while focusing when an object comes closer is indicated by arrows in FIG. 2.

In this first embodiment, the objective lens includes, from the object side toward the image side:
a first lens group LG1 of negative refractive power, and
a second lens group LG2 following of positive refracting power.

This corresponds to the general optical structure of a retro-focus lens, or inversed telephoto lens, which is capable of covering large fields of view.

It is also one of the features of this first embodiment that, in the objective lens, more than one optical element is moved independently for focusing. More precisely, two groups of lenses LG21, LG22 are moved axially for focusing. This assures a focusing process maintaining the low aberration level in the image. The first subgroup LG21 of these two subgroups has a positive refractive power, and the second LG22 also has a positive refractive power. The remaining lenses L11 to L15 between the second subgroup LG22 and the image plane, taken as a group, have a positive refractive power.

The group structure of the first embodiment can thus be summarized as

N-P-P-stop-P, where N denotes a negative refractive power and P a positive one.

The aspherical surfaces are indicated in the figures by a black dot. It is also a feature of this first embodiment that two correcting aspherical surfaces 1, 3 are positioned in the field proximity space 120 and two aspherical optical surfaces 21, 24 are positioned in the aperture stop proximity space 118. In this way four main aberrations are corrected: spherical aberration, coma, astigmatism and distortion.

Another feature of this first embodiment is provided by positioning the aspherical elements within one group adjacent to each other. This increases the correction effect on aberrations and enables a selective correction effect on higher order aberrations. For example, since the first aspherical term is affecting third order aberrations, an opposite contribution of the two aspheres could cause a reduced effect on this order of aberration, maintaining the large effect on the 5th and higher order aberrations. In this first embodiment the aspherical lens elements are positioned adjacently in both groups.

Figure 3:
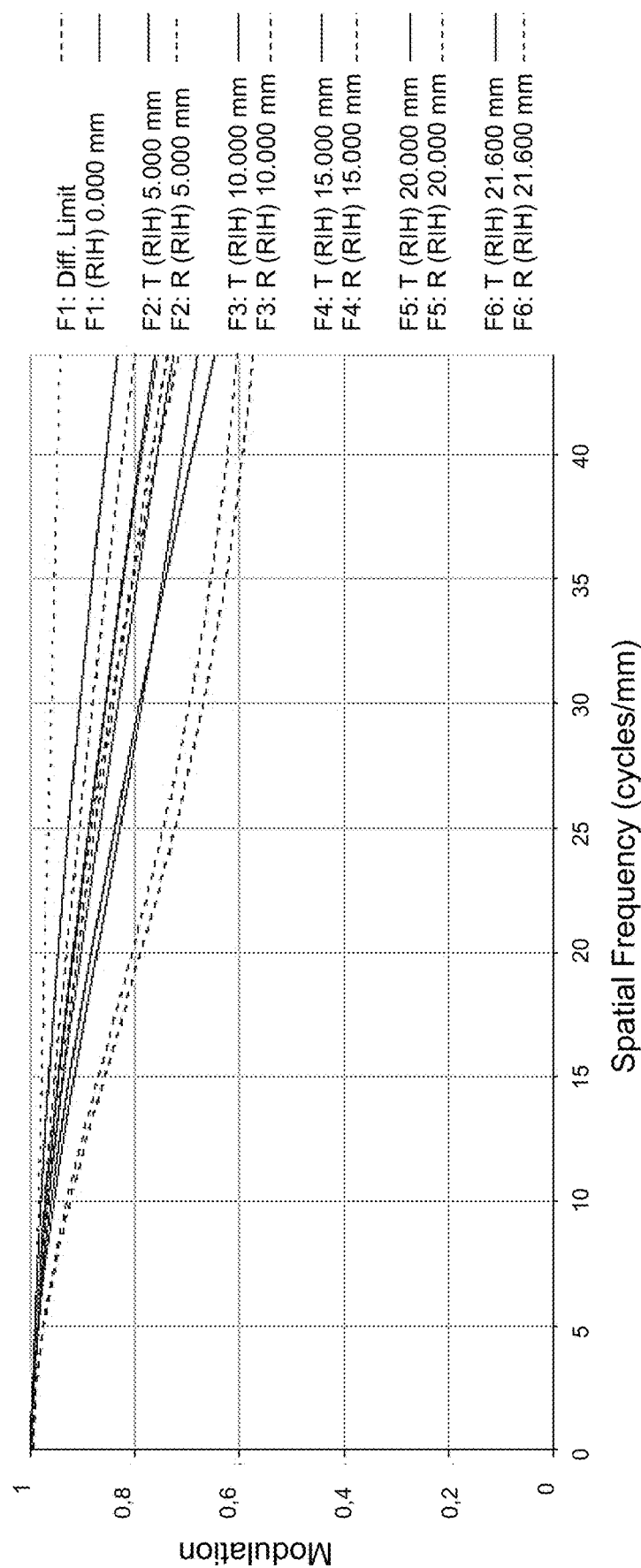
FIG. 3 shows the MTF variation with spatial frequency, for different image field heights for the lens of FIG. 1.

The correction level in terms of the MTF (modulation transfer function) vs. spatial frequency in line pairs/mm is indicated in FIG. 3. In FIG. 3, the object was positioned at infinity. The wavelengths and their weights used for calculation were:

| Wavelength/nm | Spectral line |
|---|---|
| 656.2725 | C |
| 587.5618 | d |
| 546.0740 | e |
| 486.1327 | F |
| 436.8343 | g |
| 404.6561 | h |

These are the common Fraunhofer wavelengths used for calculation wherein the weight for the g and h spectral lines are a factor of 3, respectively; 13 times lower than the weight of the other wavelength. This spectral distribution corresponds to the spectral sensitivity of common sensors.

In FIG. 3, F1 is the MTF for the object field on the optical axis with real image height (RIH) being zero. The diffraction limit curve is also indicated by a dotted line. The F2 to F6 are the field points corresponding to the real image heights from 5 mm to 21.6 mm. The letters R and T in the following lines F2, F3, . . . denote radially and tangentially oriented patterns of lines.

advantageous feature of this first embodiment may be achieved when the aspherical elements 1, 3, 21, 24 within one group are positioned adjacent to each other. This increases the correction effect on aberrations and enables a selective correction effect on higher order aberrations. For example, since the first aspherical term is influencing third order aberrations, an opposite contribution of the two aspheres could cause a reduced effect on this order of aberration, maintaining the large effect on the 5th and higher order aberrations. In this first embodiment, the aspherical lens elements 124, 126, 128, 130 are positioned adjacent to one another in both groups.

The correction of chromatic aberrations is of particular interest. Therefore a plurality of low and anomalous dispersion glasses have been used in the lens designs.

As a result, the transverse ray aberration for different relative field heights and wavelengths across the pupil typically remains below 30 μm for tangential and sagittal rays, even at a relative field height of 1 (corresponding to 41.22° of the chief ray angel on the image side). This also matches with the MTF values given in FIG. 3.

There are two kinds of chromatic aberrations: axial and lateral. In order to correct these aberrations low dispersion glasses may be used. According to the Schott glass catalog, the departure from the normal line of the relative partial dispersion, $\Delta P_{gF}$, of a chosen glass type for the g and F Fraunhofer wavelengths is given by the equation:

$$\Delta P_{gF} = \frac{n_g - n_F}{n_F - n_C} - (0.6438 - 0.001682 * v_d)$$

In this equation $n_g$, $n_F$, $n_C$ are the refractive indices of the chosen glass at the Fraunhofer wavelengths g (422.670 nm), F (486.134 nm) and C (656.281 nm) correspondingly. $v_d$ is the Abbe number of the glass type at the Fraunhofer wavelengths d (466.814 nm).

Figure 4:
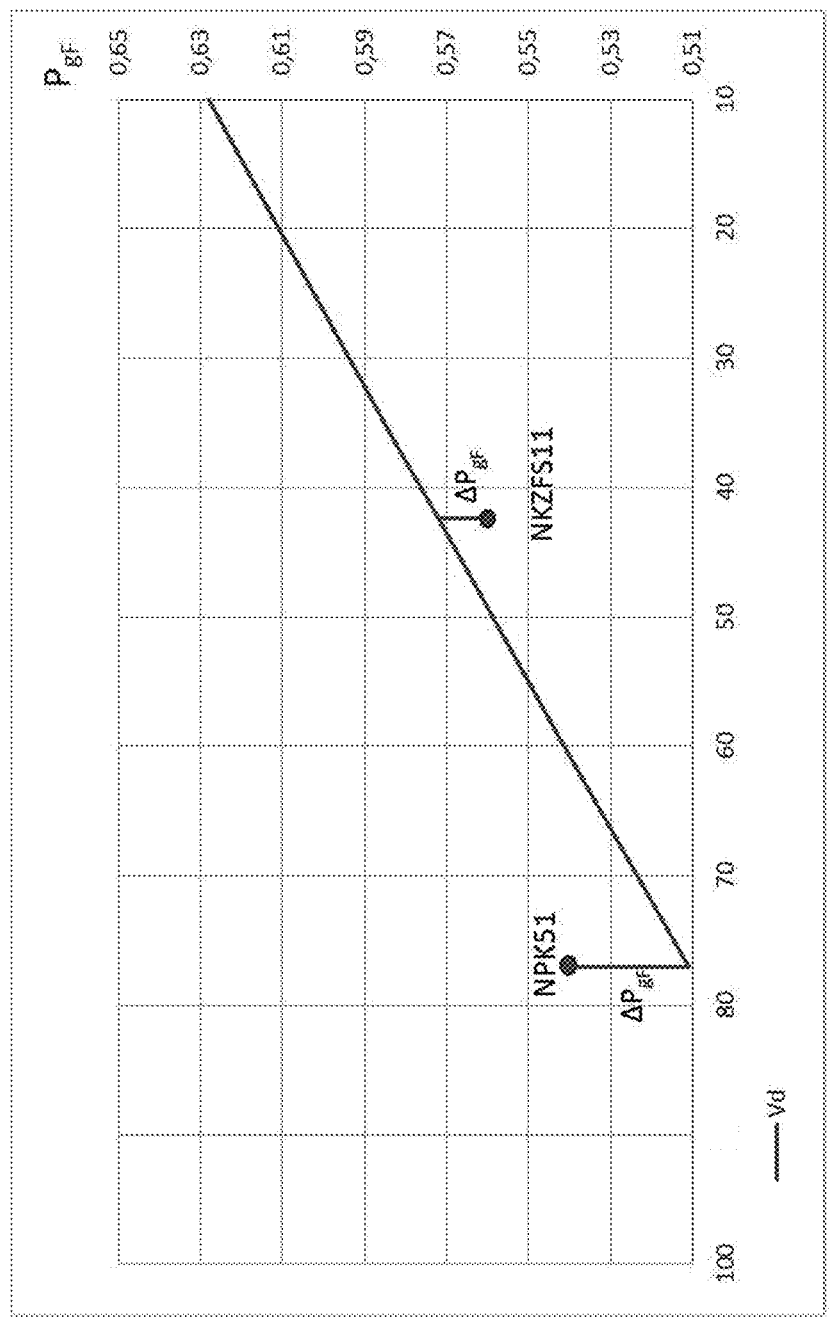
FIG. 4 shows the Δ PgF versus the Abbe number $v_d$ for two glasses having anomalous dispersion.

FIG. 4 is a graph of $P_{gF}$ versus $v_d$, that shows this value, $\Delta P_{gF}$, for the two Schott glasses NPK51 and NKZFS11. NKZFS11 is characterized by $n_d$ being 1.638 and $v_d$ being 42.4. NPK51 is characterized by $n_d$ being 1.529 and $v_d$ being 77.0.

The value $P_{gF}$ denotes the relative partial dispersion for the above mentioned Fraunhofer wavelengths g and F:

$$P_{gF} = \frac{n_g - n_F}{n_F - n_C}$$

The straight line in FIG. 4 indicates the so-called normal relative partial dispersion. The line is defined by the relative partial dispersion $P_{gF}$ of the two Schott glasses K7 ($n_d$=1.51, $v_d$=60.41) and F2 ($n_d$=1.62, $v_d$=36.37).

The term Δ PgF, indicative of the departure from the normal line, is an indicator of anomalous behavior of glass dispersion. Larger absolute values indicate a glass with a stronger anomalous behavior (anomalous dispersion glasses) and thus a better option for correcting chromatic aberrations. On the other hand, low and anomalous dispersion glasses have physical and chemical properties that make them difficult to manufacture.

If the sum of all departures from the normal line of the relative partial dispersion of all lenses is determined and divided by the number of lenses, the result is an indicator of the number of lenses with anomalous dispersion and call it Glass anomalous ratio (GAR):

$$GAR = \frac{\Sigma |\Delta P_{gF}|}{\text{number of lenses}} * 10^4$$

If this number is too large, then there are too many lenses made of glass having anomalous dispersion. If the number is too small, then there is not enough potential for correcting chromatic aberrations. A ratio between 125<GAR<175 would ensure a good potential for correcting chromatic aberrations.

Using the lens data provided in Table 6A and Table 6B, the different transversal aberration curves for one field point and different wavelengths have a very small departure from one to another, indicating a very low level of chromatic aberration.

The best correction of chromatic aberration can be achieved when abnormal glasses of the type fluorite crown are used in positive powered lenses and dense or special short flints are used in negative powered lenses, when the lenses are positioned in the aperture stop proximity space. In the field proximity spaces, low dispersion abnormal glasses are to be used in order to reduce the chromatic aberration contributions from these lenses.

In this first embodiment, there are five lenses with anomalous dispersion behavior in the aperture stop proximity space 118: L7, L8, L9, L10, and L12. The low and anomalous dispersion glasses are used in positive powered lenses L8 (NPK51), L10 (SFPL53) and L13 (SFPM2) and a high and anomalous dispersion glass is used in the negative powered lens L9 (NKZFS8).

In the field proximity spaces 120, 122 there are low and anomalous dispersion glasses in L1 (SFPM3) and L15 (SFPL53), reducing their influence on chromatic aberrations. All other glasses have also a significant departure from the normal line.

For the first embodiment GAR=157.

Second Embodiment

FIG. 5 shows a schematic view of the lens corresponding to a second embodiment of the present invention, which includes a prime lens with a focal length of about 35 mm and an f-number of about 1.7. FIG. 5 shows the lens structure of the second embodiment with the main rays for the axial and outmost off-axial field point: the marginal ray and the chief ray. The object side field proximity space 520 contains the first four lenses L1 to L4 and the image side field proximity space 522 contains only the lens L14. There is one aspherical lens element in the object side field proximity group on lens L1, which has an meniscus type shape. The lenses L5 to L13 are included in the aperture stop proximity space 518. There are two aspherical lens elements in this space L11 and L12 as seen in FIG. 5. Preferably, their image side surfaces 526 and 528 are aspherical.

The second embodiment can be summarized as shown in Table 8.

TABLE 8

| Lens | Power |
| --- | --- |
| L1* | − |
| L2 | − |
| L3 | − |
| L4 | + |
| L5 | − |
| L6 | + |
| L7 | + |
| L8 | + |
| L9 | − |
| L10 | + |
| Stop | |
| L11* | − |
| L12* | + |
| L13 | − |
| L14 | + |

The * denotes the aspheres. There are no other lens elements in this objective lens.

With this general setup, the major advantages of the invention can be achieved.

The aspherical surfaces are preferably positioned as follows:

The first aspherical surface 524 is located on the object side surface of the first lens L1, i.e. in the object side field proximity space 520.

The second aspherical surface 526 is located on the image side surface of lens L11, i.e. in the aperture stop proximity space 518.

The third aspherical surface 528 is located on the image side surface of lens L12, i.e. also in the aperture stop proximity space 518.

As explained above, at these positions, the aspherical surfaces may have a very strong effect on correcting different aberrations.

An advantageous realization of the second embodiment may be implemented using lenses with the form indicated in Table 9.

TABLE 9

| Lens | Power | Form |
| --- | --- | --- |
| L1* | − | meniscus |
| L2 | − | meniscus |
| L3 | − | meniscus |
| L4 | + | biconvex |
| L5 | − | biconcave |
| L6 | + | biconvex |
| L7 | + | meniscus |
| L8 | + | meniscus |

TABLE 9-continued

| Lens | Power | Form |
|---|---|---|
| L9 | − | meniscus |
| L10 | + | meniscus |
| Stop | | |
| L11* | − | meniscus |
| L12* | + | biconvex |
| L13 | − | biconcave |
| L14 | + | biconvex |

Further advantages can be achieved by using the orientations of the lenses shown in Table 10.

TABLE 10

| Lens | Power | Form | Orientation |
|---|---|---|---|
| L1* | − | meniscus | convex towards object |
| L2 | − | meniscus | convex towards object |
| L3 | − | meniscus | concave towards object |
| L4 | + | biconvex | |
| L5 | − | biconcave | |
| L6 | + | biconvex | |
| L7 | + | meniscus | convex towards object |
| L8 | + | meniscus | convex towards object |
| L9 | − | meniscus | convex towards object |
| L10 | + | meniscus | convex towards object |
| Stop | | | |
| L11* | − | meniscus | concave towards object |
| L12* | + | biconvex | |
| L13 | − | biconcave | |
| L14 | + | biconvex | |

Further advantages can be achieved by using lenses having the glass types shown in Table 11.

TABLE 11

| Lens | Power | Form | Orientation | glass type |
|---|---|---|---|---|
| L1* | − | meniscus | convex towards object | phosphate crown |
| L2 | − | meniscus | convex towards object | lanthanum dense flint |
| L3 | − | meniscus | concave towards object | barium flint |
| L4 | + | biconvex | | lanthanum dense flint |
| L5 | − | biconcave | | dense flint |
| L6 | + | biconvex | | lanthanum dense flint |
| L7 | + | meniscus | convex towards object | dense flint |
| L8 | + | meniscus | convex towards object | phosphate crown |
| L9 | − | meniscus | convex towards object | barium dense flint |
| L10 | + | meniscus | convex towards object | phosphate crown |
| Stop | | | | |
| L11* | − | meniscus | concave towards object | lanthanum dense flint |
| L12* | + | biconvex | | dense phosphate crown |
| L13 | − | biconcave | | lanthanum dense flint |
| L14 | + | biconvex | | borosilicate crown |

The definitions of the glass types are listed in the glossary below.

Further advantages can be achieved by using the ranges of focal lengths for the lenses shown in Table 12.

TABLE 12

| Lens | Power | Form | Orientation | glass type | range of focal length |
|---|---|---|---|---|---|
| L1* | − | meniscus | convex towards object | phosphate crown | −173.90 ± 50% |
| L2 | − | meniscus | convex towards object | lanthanum dense flint | −66.29 ± 50% |
| L3 | − | meniscus | concave towards object | barium flint | −70.48 ± 50% |
| L4 | + | biconvex | | lanthanum dense flint | 153.95 ± 50% |
| L5 | − | biconcave | | dense flint | −52.55 ± 50% |
| L6 | + | biconvex | | lanthanum dense flint | 42.92 ± 50% |
| L7 | + | meniscus | convex towards object | dense flint | 100.94 ± 50% |
| L8 | + | meniscus | convex towards object | phosphate crown | 196.73 ± 50% |
| L9 | − | meniscus | convex towards object | barium dense flint | −84.63 ± 50% |
| L10 | + | meniscus | convex towards object | phosphate crown | 139.58 ± 50% |
| Stop | | | | | |
| L11* | − | meniscus | concave towards object | lanthanum dense flint | −78.95 ± 50% |
| L12* | + | biconvex | | dense phosphate crown | 38.46 ± 50% |
| L13 | − | biconcave | | lanthanum dense flint | −28.30 ± 50% |
| L14 | + | biconvex | | borosilicate crown | 38.28 ± 50% |

The numerical data of the objective lens of the second embodiment according to FIG. 5 are shown in Table 13A.

The aspherical constants for the aspheres used in the second embodiment are shown in Table 13B.

The effect of the different aspherical surfaces used in the second embodiment on different aberrations is shown in Table 14.

It can be clearly seen that the aspherical contribution (shown in bold type) on astigmatism and distortion of the first aspherical surface 1 (in Table 14) included in the field proximity group of lenses is substantially greater than the contribution of the same surface 1 on spherical aberration and coma. The two aspherical surfaces on lenses L11 and L12 corresponding to the position in the aperture proximity group of lenses have a substantial effect (indicated in bold type) on spherical aberration and coma and less on astigmatism and distortion. The distribution of aspherical lens elements as specified in Table 14 may provide an optimal correction of image aberrations.

Figure 6:
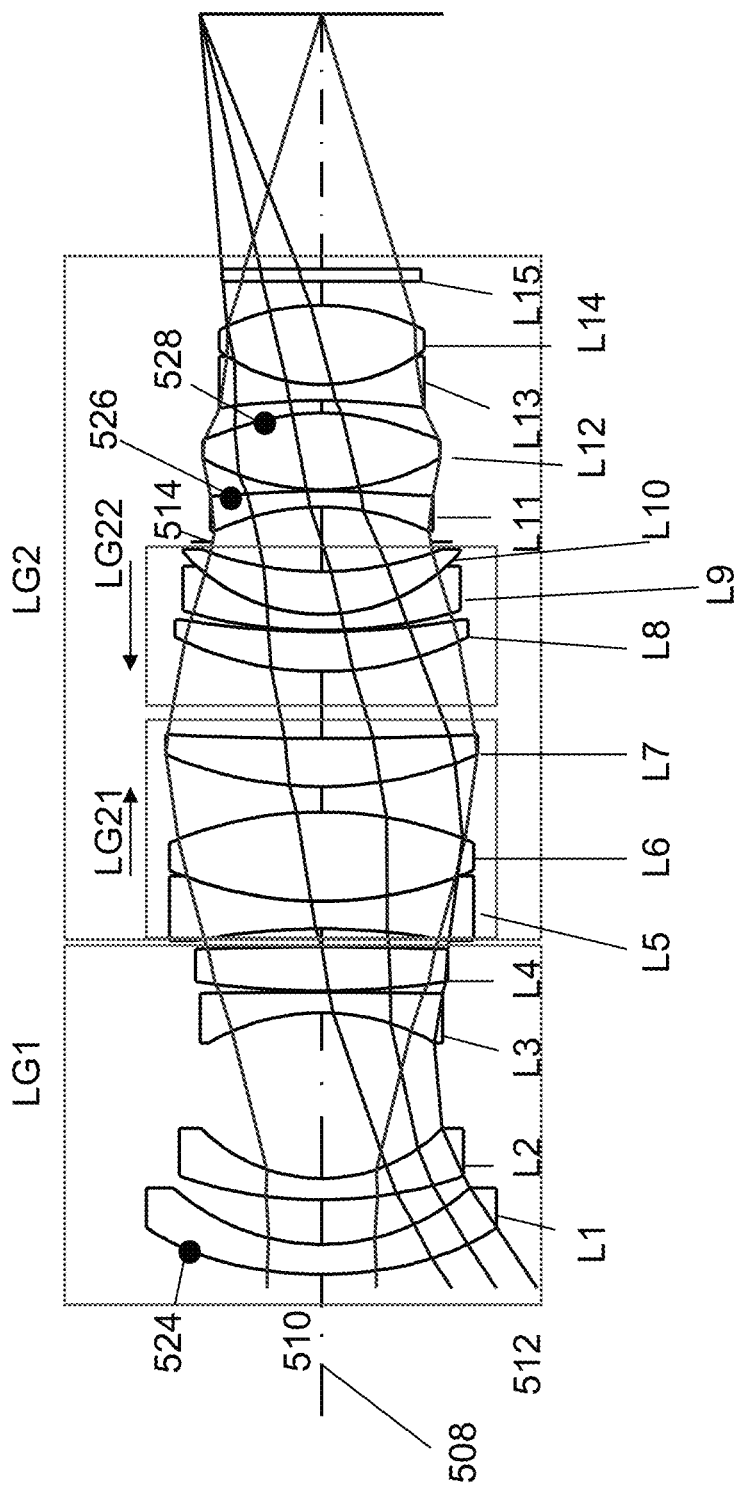
FIG. 6 shows the sectional view of the lens of FIG. 5 including the group structure and the subgroups moving for focusing.

FIG. 6 illustrates the group separation of the lenses of the objective lens of FIG. 5. Similar to the example shown in FIG. 2, the axial and outmost off axis beams are shown by three rays. The system again comprises two main groups LG1, LG2 and the second group LG2 again includes the aperture stop 514 and two independently moving lens groups LG21 and LG22 for focusing.

In this second embodiment, the lens includes (from the object side toward the image side):
  a first lens group LG1 of negative refractive power, and
  a second lens group LG2 following of positive refracting power.

It is also one of the features of this second embodiment that in the objective lens more than one optical element is moved independently for focusing. More precisely, there are two groups of lenses LG21, LG22 configured to move axially for focusing. This assures a focusing process that maintains low aberration level in the image. The first subgroup LG21 of these two subgroups has a positive refractive power, and the second subgroup LG22 also has a positive refractive power. The remaining lenses L11 to L14 between the second subgroup LG22 and the image plane taken as a group have a positive refractive power.

The group structure of the second embodiment can thus be summarized as:

N-P-P-Stop-P, where N denotes a negative refractive power and P a positive one.

The aspherical surfaces are indicated by a black dot. One correcting aspherical surface 1 is positioned in the field proximity space 520 and two aspherical optical surfaces 22, 24 are positioned in the aperture stop proximity space 518. In this way again, four main aberrations are corrected: spherical aberration, coma, astigmatism and distortion.

The first two lenses L1, L2 in the first group are of a meniscus type and the first lens L1 has an aspherical shape 1 on the object side, which may optimize correction and manufacturability.

Figure 7:
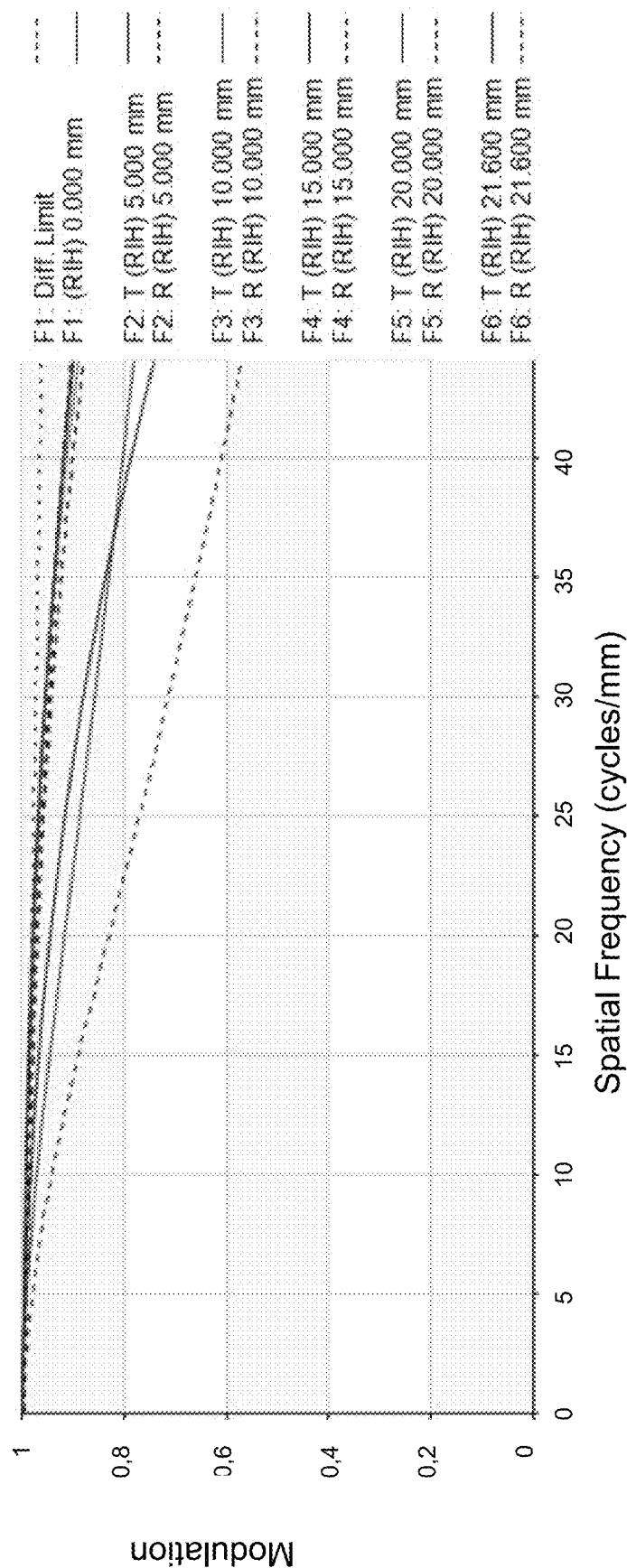
FIG. 7 shows the MTF variation with spatial frequency, for different image field heights for the lens of FIG. 5.

FIG. 7 shows the MTF vs. spatial frequency for different image field heights. The legend corresponds to that of FIG. 3.

Also for this embodiment, the transverse ray aberrations are typically below 30 μm both for tangential and sagittal rays.

The lens data in Table 13A suggests a substantial use of glasses with anomalous dispersion.

The second embodiment includes seven lenses with anomalous dispersion behavior in the aperture stop proximity space 518: L5, L6, L8, L9, L10, L11 and L12. The low and anomalous dispersion glasses are used in the positive powered lenses L8 (SFPL51), L10 (SFPL51), and L12 (SFPM2) and high and anomalous dispersion glasses are used in the negative powered lens L9 (NKZFS5).

field proximity spaces 520, 522 include low and anomalous dispersion glasses in L1 (SFPM3) and L14 (SFPL51), reducing their effect on chromatic aberrations. All other glasses also have a significant departure from the normal line.

The GAR for the second embodiment is 146.

Third Embodiment

FIG. 8 shows a schematic view according to a third embodiment comprising a second prime lens with a focal length of about 35 mm and an f-number of about 1.7 with a different configuration than the second embodiment. In FIG. 8, the lens structure of the third embodiment is shown with the main rays for the axial and outmost off-axial field point: the marginal ray and the chief ray. The field proximity spaces 820, 822 on the object and the image side include the lenses L1 to L6 and L14. The aperture stop proximity space contains 7 lenses L7 to L13. Two aspherical lenses L1, L2 are positioned in the object side field proximity space 820. Both lenses are of meniscus shape and the aspherical surfaces 1, 3 are on the convex side toward the object. The aperture stop proximity space 818 includes only one aspherical lens element L11, just after the aperture stop 814.

The third embodiment can be summarized as follows:

TABLE 15

| Lens | Power |
|---|---|
| L1* | − |
| L2* | − |
| L3 | − |
| L4 | + |
| L5 | − |
| L6 | + |
| L7 | + |
| L8 | + |
| L9 | − |
| L10 | + |
| Stop | |
| L11* | − |
| L12 | + |
| L13 | − |
| L14 | + |

The * denotes the aspheres. There are no other lens elements in this objective lens in this example implementation.

With this general setup, the major advantages of the invention can be achieved.

The aspherical surfaces are preferably positioned as follows:

The first aspherical surface 824 is located on the object side surface of the first lens L1, i.e. in the object side field proximity space 820.

The second aspherical surface 826 is located on the object side surface of lens L2, i.e. also in the object side field proximity space 820.

The third aspherical surface 828 is located on the image side surface of lens L11, i.e. in the aperture stop proximity space 818.

As explained above, at these positions, the aspherical surfaces exhibit a very strong effect on correcting different aberrations.

An advantageous realization of the third embodiment may be implemented using lenses with the form indicated in Table 16.

TABLE 16

| Lens | Power | Form |
|---|---|---|
| L1* | − | meniscus |
| L2* | − | meniscus |
| L3 | − | biconcave |
| L4 | + | biconvex |
| L5 | − | biconcave |
| L6 | + | biconvex |
| L7 | + | biconvex |
| L8 | + | meniscus |
| L9 | − | meniscus |
| L10 | + | meniscus |
| Stop | | |
| L11* | − | meniscus |
| L12 | + | biconvex |
| L13 | − | meniscus |
| L14 | + | biconvex |

Further advantages can be achieved by using the orientations of the lenses shown in Table 17.

TABLE 17

| Lens | Power | Form | Orientation |
|---|---|---|---|
| L1* | − | meniscus | convex towards object |
| L2* | − | meniscus | convex towards object |
| L3 | − | biconcave | |

TABLE 17-continued

| Lens | Power | Form | Orientation |
|---|---|---|---|
| L4 | + | biconvex | |
| L5 | − | biconcave | |
| L6 | + | biconvex | |
| L7 | + | biconvex | |
| L8 | + | meniscus | convex towards object |
| L9 | − | meniscus | convex towards object |
| L10 Stop | + | meniscus | convex towards object |
| L11* | − | meniscus | concave towards object |
| L12 | + | biconvex | |
| L13 | − | meniscus | convex towards object |
| L14 | + | biconvex | |

Further advantages can be achieved by using lenses having the glass types shown in Table 18.

TABLE 18

| Lens | Power | Form | Orientation | glass type |
|---|---|---|---|---|
| L1* | − | meniscus | convex towards object | phosphate crown |
| L2* | − | meniscus | convex towards object | lanthanum dense flint |
| L3 | − | biconcave | | barium light flint |
| L4 | + | biconvex | | lanthanum dense flint |
| L5 | − | biconcave | | dense flint |
| L6 | + | biconvex | | lanthanum dense flint |
| L7 | + | biconvex | | dense flint |
| L8 | + | meniscus | convex towards object | phosphate crown |
| L9 | − | meniscus | convex towards object | barium dense flint |
| L10 Stop | + | meniscus | convex towards object | phosphate crown |
| L11* | − | meniscus | concave towards object | lanthanum dense flint |
| L12 | + | biconvex | | dense phosphate crown |
| L13 | − | meniscus | convex towards object | lanthanum dense flint |
| L14 | + | biconvex | | fluorite crown |

The definitions of the glass types are given in the glossary.

Further advantages can be achieved by using the ranges of focal lengths for the lenses shown in Table 19.

TABLE 19

| Lens | Power | Form | Orientation | glass type | range of focal length |
|---|---|---|---|---|---|
| L1* | − | meniscus | convex towards object | phosphate crown | −116.92 ± 50% |
| L2* | − | meniscus | convex towards object | lanthanum dense flint | −167.15 ± 50% |
| L3 | − | biconcave | | barium light flint | −41.04 ± 50% |
| L4 | + | biconvex | | lanthanum dense flint | 70.58 ± 50% |
| L5 | − | biconcave | | dense flint | −47.62 ± 50% |
| L6 | + | biconvex | | lanthanum dense flint | 41.74 ± 50% |
| L7 | + | biconvex | | dense flint | 99.85 ± 50% |
| L8 | + | meniscus | convex towards object | phosphate crown | 159.17 ± 50% |
| L9 | − | meniscus | convex towards object | barium dense flint | −63.63 ± 50% |
| L10 Stop | + | meniscus | convex towards object | phosphate crown | 85.20 ± 50% |
| L11* | − | meniscus | concave towards object | lanthanum dense flint | −77.75 ± 50% |
| L12 | + | biconvex | | dense phosphate crown | 47.66 ± 50% |
| L13 | − | meniscus | convex towards object | lanthanum dense flint | −45.65 ± 50% |
| L14 | + | biconvex | | fluorite crown | 48.46 ± 50 |

The numerical data of the objective lens of the third embodiment according to FIG. 8 is shown in Table 20A.

The aspherical constants for the aspheres used in the third embodiment are shown in Table 20B.

The influence of the different aspherical surfaces on aberration correction is shown in Table 21. The biggest effects of the aspherical surfaces are in bold type. It is evident from the data in Table 21 that the aspherical surfaces 1, 3 in the object side field proximity space 820 are mainly for astigmatism correction and distortion and the aspherical surface 21 in the aperture stop proximity space 818 is mainly for controlling spherical aberration and coma.

The selection of glass material includes a plurality of glasses with anomalous dispersion. However, the glasses keep the GAR at a value of 157, which is within the optimum limits.

It can be seen from the lens data in Table 20A that a lot of glasses with anomalous dispersion have been used.

In this third embodiment, five lenses with anomalous dispersion behavior are positioned in the aperture stop proximity space: L8, L9, L10, L11, and L12. The low and anomalous dispersion glasses are used in the positive powered lenses L8 (SFPM3), L10 (SFPL51) and L12 (SFPM2) and high and anomalous dispersion glasses are used in negative powered lens L9 (NKZFS8) and L11 (SLAH58).

The field proximity spaces include low and anomalous dispersion glasses in L1 (SFPL51) and L14 (SFPL53), reducing their effect on chromatic aberrations. All other glasses also have a significant departure from the normal line.

Figure 9:
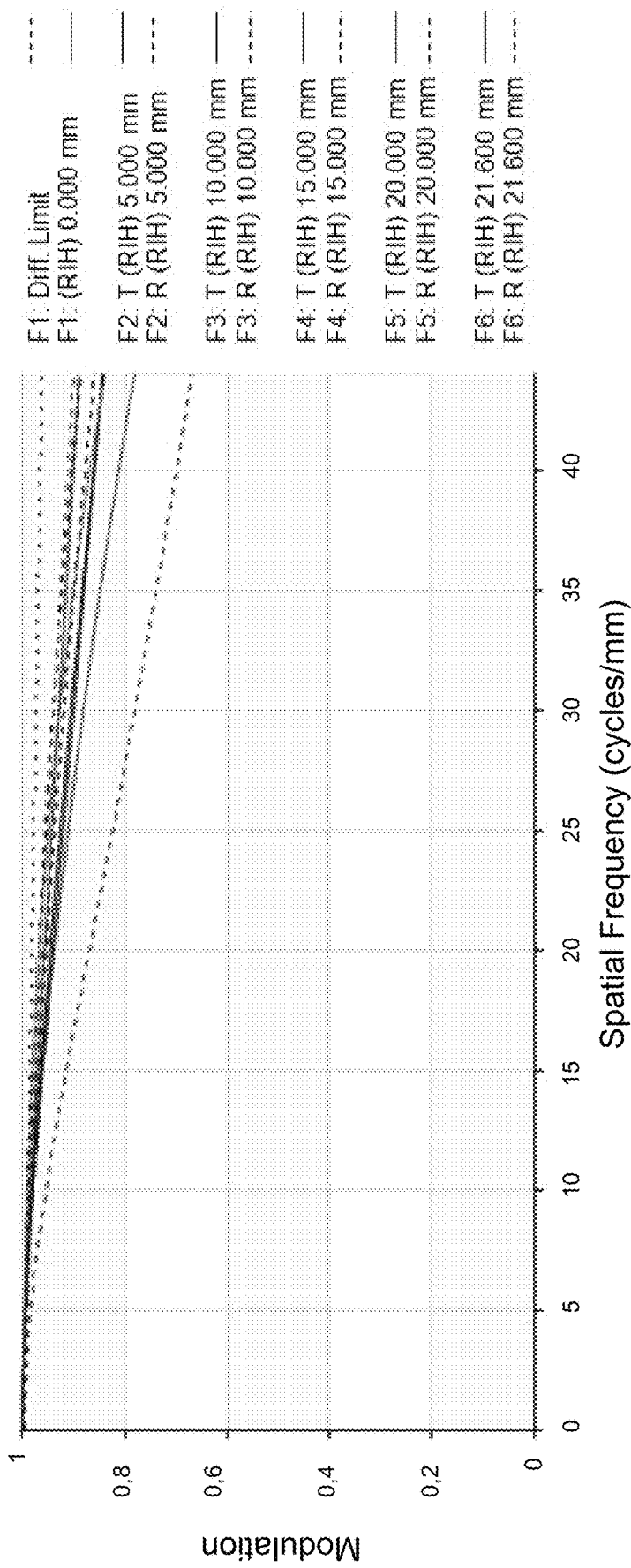
FIG. 9 shows the MTF variation with spatial frequency, for different image field heights for the lens of FIG. 8.

The Modulation Transfer Function (MTF) is shown in FIG. 9. The graph in FIG. 9 shows the MTF versus the spatial frequency for different image field heights. The legend for FIG. 9 corresponds to that of FIG. 3.

For this embodiment, the transverse ray aberrations are typically below 30 μm both for tangential and sagittal rays.

Figure 10:
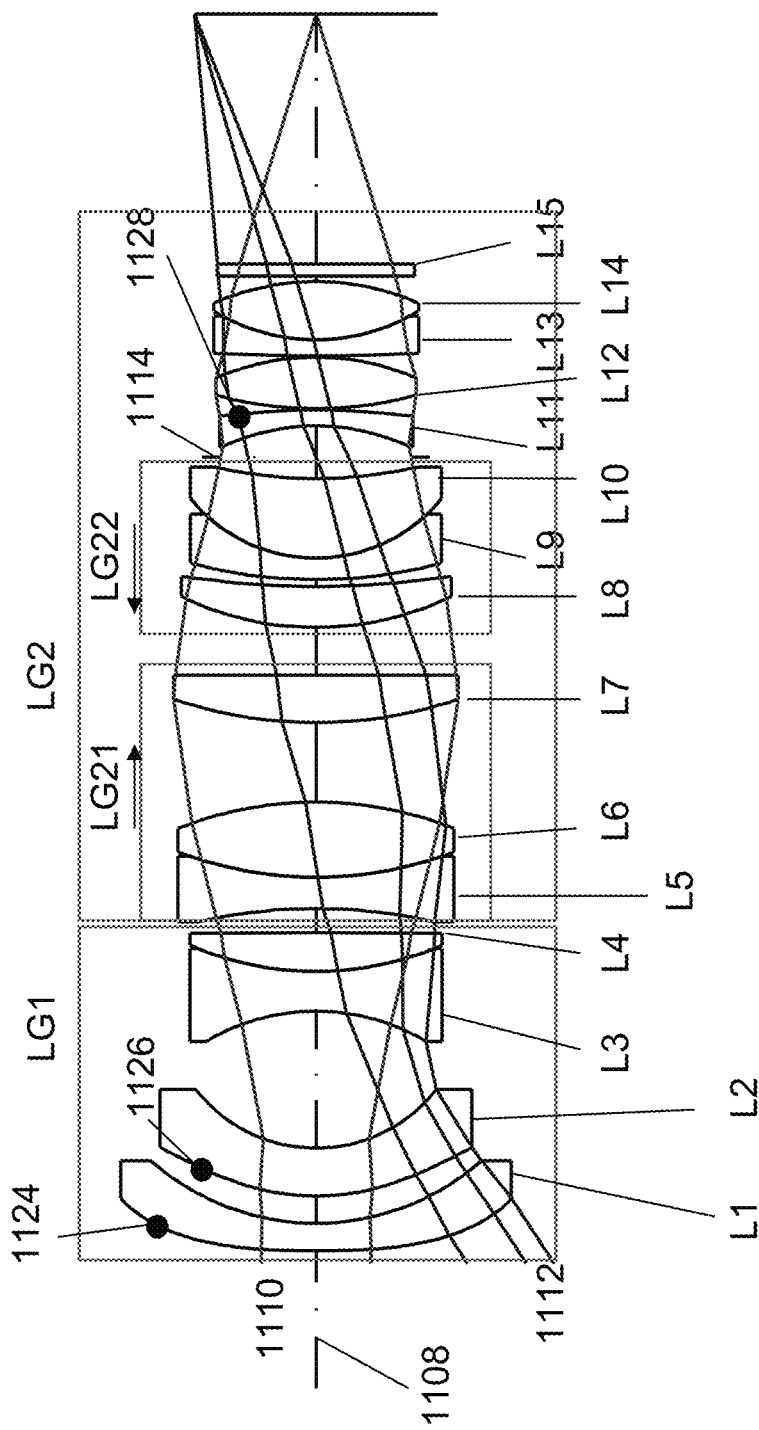
FIG. 10 shows the sectional view of the lens of FIG. 8 including the group structure and the subgroups moved for focusing.

The group distribution for the lens in this third embodiment is represented in FIG. 10. The legend for FIG. 10 corresponds to that of FIG. 2.

The first subgroup LG21 of these two subgroups has a positive refractive power, and the second LG22 also has positive refractive power. The remaining lenses L11 to L14 between the second subgroup LG22 and the image plane taken as a group have a positive refractive power.

The group structure of the third embodiment can thus be summarized as

N-P-P-Stop-P, where N denotes a negative refractive power and P a positive one.

The second and third embodiment are two objective lenses with the same focal length of 35 mm and aperture value f-number of 1.7. The two configurations also have similar correction means but distributed in two different ways. In the second embodiment according to FIG. 5 and Table 13A two aspherical elements L11, L12 are in the aperture stop proximity space 818 and one aspherical element L1 is in the field proximity space. In the third embodiment according to FIG. 8 and Table 20A two aspherical elements L1, L2 are in the field proximity space and one aspherical element L11 is in the aperture stop proximity space 818. These two configurations may result in an optimal corrected lens as described.

Fourth Embodiment

FIG. 11 shows a schematic view of the lens corresponding to a fourth embodiment of the present invention, which includes a prime lens with a focal length of about 50 mm and an f-number of about 1.7.

FIG. 11 shows the marginal ray and the chief ray from the outmost field point and the intersection points between these rays. According to the definition of proximity spaces used in describing the first embodiment, there are also three spaces in this embodiment. The object side field proximity space 1120 includes lenses L1 to L5 and has one aspherical element 1124 on the second lens L2. The field proximity space 1122 on the image side comprises L13 and L14. The lens L14 is an aspherical lens element. The aperture stop proximity space 1118 includes lenses L6 to L12, including the aspherical lens element L10.

The fourth embodiment can be summarized as follows:

TABLE 22

| Lens | Power |
|------|-------|
| L1   | −     |
| L2*  | −     |
| L3   | +     |
| L4   | −     |
| L5   | +     |
| L6   | +     |
| L7   | −     |
| L8   | +     |
| L9   | −     |
| Stop |       |
| L10* | −     |
| L11  | +     |
| L12  | −     |
| L13  | +     |
| L14* | +     |

The * denotes the aspheres. There are no other lens elements in this objective lens in this example implementation.

With this general setup, the major advantages of the invention can be achieved.

The aspherical surfaces are preferably positioned as follows:

The first aspherical surface 1124 is located on the object side surface of the second lens L2, i.e. in the object side field proximity space 1120.

The second aspherical surface 1126 is located on the object side surface of lens L10, i.e. in the aperture stop proximity space 1118.

The third aspherical surface 1128 is located on the object side surface of lens L14, i.e. in the image side field proximity space 1122.

As explained above, at these positions, the above lenses have a very strong effect on correcting different aberrations.

An advantageous realization of the fourth embodiment may be implemented using lenses with the form indicated in Table 23.

TABLE 23

| Lens | Power | Form         |
|------|-------|--------------|
| L1   | −     | meniscus     |
| L2*  | −     | biconcave    |
| L3   | +     | biconvex     |
| L4   | −     | biconcave    |
| L5   | +     | plane-convex |
| L6   | +     | biconvex     |
| L7   | −     | meniscus     |
| L8   | +     | biconvex     |
| L9   | −     | meniscus     |
| Stop |       |              |
| L10* | −     | biconcave    |
| L11  | +     | biconvex     |
| L12  | −     | meniscus     |
| L13  | +     | meniscus     |
| L14* | +     | meniscus     |

Further advantages can be achieved by using the orientations of the lenses shown in Table 24.

TABLE 24

| Lens | Power | Form         | Orientation           |
|------|-------|--------------|-----------------------|
| L1   | −     | meniscus     | convex towards object |
| L2*  | −     | biconcave    |                       |
| L3   | +     | biconvex     |                       |
| L4   | −     | biconcave    |                       |
| L5   | +     | plane-convex |                       |
| L6   | +     | biconvex     |                       |
| L7   | −     | meniscus     | concave towards object|
| L8   | +     | biconvex     |                       |
| L9   | −     | meniscus     | concave towards object|
| Stop |       |              |                       |
| L10* | −     | biconcave    |                       |
| L11  | +     | biconvex     |                       |
| L12  | −     | meniscus     | convex towards object |
| L13  | +     | meniscus     | convex towards object |
| L14* | +     | meniscus     | concave towards object|

Further advantages can be achieved by using lenses having the glass types shown in Table 25.

TABLE 25

| Lens | Power | Form         | Orientation            | glass type             |
|------|-------|--------------|------------------------|------------------------|
| L1   | −     | meniscus     | convex towards object  | phosphate crown        |
| L2*  | −     | biconcave    |                        | dense phosphate crown  |
| L3   | +     | biconvex     |                        | lanthanum dense flint  |
| L4   | −     | biconcave    |                        | barium dense flint     |
| L5   | +     | plane-convex |                        | dense flint            |
| L6   | +     | biconvex     |                        | phosphate crown        |
| L7   | −     | meniscus     | concave towards object | barium light flint     |

TABLE 25-continued

| Lens | Power | Form | Orientation | glass type |
|---|---|---|---|---|
| L8 | + | biconvex | | phosphate crown |
| L9 | − | meniscus | concave towards object | barium light flint |
| Stop | | | | |
| L10* | − | biconcave | | barium dense flint |
| L11 | + | biconvex | | dense phosphate crown |
| L12 | − | meniscus | convex towards object | barium dense flint |
| L13 | + | meniscus | convex towards object | phosphate crown |
| L14* | + | meniscus | concave towards object | lanthanum dense flint |

The definitions of the glass types are given in the glossary.

Further advantages can be achieved by using the ranges of focal lengths for the lenses shown in Table 26.

TABLE 26

| Lens | Power | Form | Orientation | glass type | range of focal length |
|---|---|---|---|---|---|
| L1 | − | meniscus | convex towards object | phosphate crown | −108.38 ± 50% |
| L2* | − | biconcave | | dense phosphate crown | −72.91 ± 50% |
| L3 | + | biconvex | | lanthanum dense flint | 30.99 ± 50% |
| L4 | − | biconcave | | barium dense flint | −40.23 ± 50% |
| L5 | + | plane-convex | | dense flint | 297.03 ± 50% |
| L6 | + | biconvex | | phosphate crown | 100.97 ± 50% |
| L7 | − | meniscus | concave towards object | barium light flint | −205.13 ± 50% |
| L8 | + | biconvex | | phosphate crown | 50.26 ± 50% |
| L9 | − | meniscus | concave towards object | barium light flint | −163.42 ± 50% |
| Stop | | | | | |
| L10* | − | biconcave | | barium dense flint | −59.03 ± 50% |
| L11 | + | biconvex | | dense phosphate crown | 48.05 ± 50% |
| L12 | − | meniscus | convex towards object | barium dense flint | −71.28 ± 50% |
| L13 | + | meniscus | convex towards object | phosphate crown | 329.30 ± 50% |
| L14* | + | meniscus | concave towards object | lanthanum dense flint | 401.68 ± 50% |

The numerical data of the objective lens of the fourth embodiment according to FIG. 11 are shown in Table 27A.

The aspherical constants for the aspheres used in the fourth embodiment are shown in Table 27B.

Since the focal length of the lens is larger, the field proximity space is reduced as compared with the corresponding spaces within the 25 mm and 35 mm focal length objective lenses. As a consequence, the contribution of the aspherical surface is increased for the aberration depending on the marginal ray height, as can be seen in Table 28.

Table 28 shows the contribution of the aspherical surfaces to the correction of the different aberrations. The biggest influences of the aspherical surfaces are again in bold type.

It can be clearly seen that the impact of the aspherical surfaces 3, 26 in the field proximity space 1120, 1122 on distortion is by a large factor greater than the impact of the aspherical surface 18 in the aperture stop proximity space 1118 on the same aberration. The action of the aperture proximity aspherical surface 18 on spherical aberration is also by a large factor stronger than the action of the two field proximity aspherical surfaces 3, 26 on the same aberration.

Figure 12:
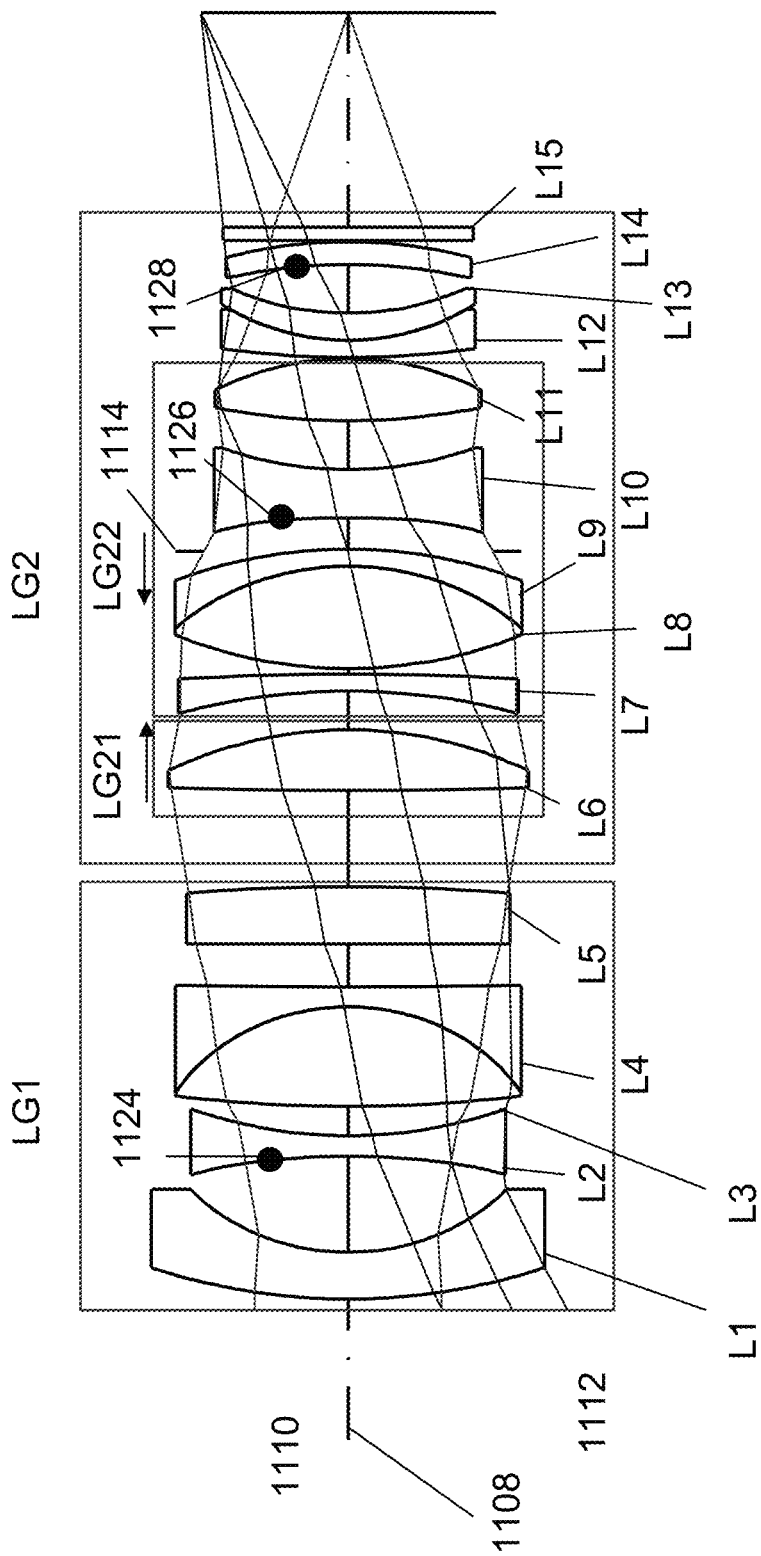
FIG. 12 shows the sectional view of the lens of FIG. 11 including the group structure and the subgroups moved for focusing.

The lens comprises a plurality of lens elements which can be separated into groups as indicated in FIG. 12. The legend in FIG. 12 corresponds to that of FIG. 2.

As shown in FIG. 12, the lenses can be divided into two groups: a first group LG1 comprising one aspherical lens element L2 and a second group LG2 which comprises two aspherical lens elements L10 and L14. The LG2 contains two subgroups, which can be moved for focusing LG21 and LG22.

The two subgroups LG21, LG22 have a positive refractive power. The remaining lenses L11 to L14 between the second subgroup LG22 and the image plane taken as a group also have a positive refractive power.

The group structure of the fourth embodiment can thus be summarized as

N-P-P-Stop-P, with the aperture stop 1114 being part of LG22, where N denotes a negative refractive power and P a positive one.

Figure 13:
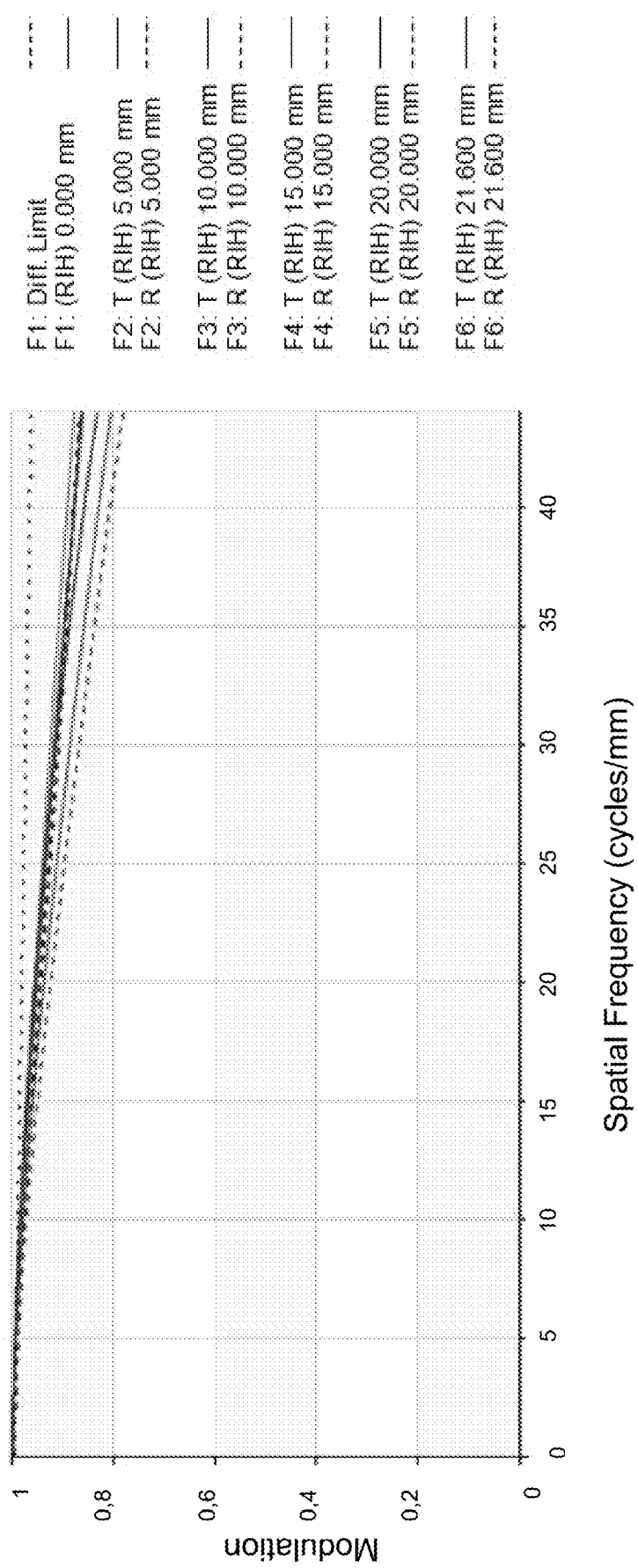
FIG. 13 shows the MTF variation with spatial frequency, for different image field heights for the lens of FIG. 11.

FIG. 13 illustrates data regarding a lens configured according to the fourth embodiment. The Modulation Transfer Function MTF is represented versus the spatial frequency for different image field heights in FIG. 13. The legend in FIG. 13 corresponds to that of FIG. 3.

As could be seen from this diagram, there is an outstanding performance due to the optimal distribution of aspherical lens elements within the objective lens.

The glass materials used are listed in Table 27A. It could be easily calculated for one skilled in the art that the GAR ratio has a value of 151 for this lens, thus within the optimum limits.

While the present invention has been described and illustrated in conjunction with a number of specific embodiments, those skilled in the art will appreciate that variations and modifications may be made without departing from the principles of the inventions as herein illustrated, as described and claimed. The present invention may be embodied in other specific forms without departing from their spirit or essential characteristics. The described embodiments are considered in all respects to be illustrative and not restrictive. The scope of the inventions are, therefore, indicated by the appended claims, rather than by the foregoing description.

Many objective lenses with diverse focal lengths can be made based on the types of objective lenses disclosed in this application. Not only the described embodiments can be realized, but a whole series of objective lenses can be realized based on the teaching of the invention. This is at least possible by simply scaling all distances and radii by the ratio of the desired focal length and the focal length of a disclosed embodiment.

Glossary

Objective Lens

An objective lens or—in short—an objective is the optical element that gathers light from the object being observed and focuses the light rays to produce a real image, typically on an image sensor or film. Objective lenses are also called object lenses or simply lenses.

Optical Element

In this specification, an optical element denotes a single lens or doublet lens or a lens group.

Lens

A lens means a single lens or an objective lens.

Lens Element

A lens elements designates a single lens or a lens doublet.

Lens Group

A lens group is a group of lens elements comprising one or more lens elements.

F-Number

The f-number of an optical system such as a camera lens is the ratio of the system's focal length to the diameter of the entrance pupil. The entrance pupil being the optical image of the physical aperture stop, as 'seen' through the front of the lens system.

Full Frame Image Sensor

The term full frame is used as a shorthand for an image sensor format which is the same size as a 35 mm format film, i.e. 36 mm×24 mm.

Marginal Ray

According to M. J. Kidger: "Fundamental Optical Design", SPIE Press, Bellingham, W A 2001, the marginal ray is defined to be the ray which passes through the center of the object and the edge of the aperture stop.

$H_M$

The marginal ray has at every intersection point with an optical surface a distance $H_M$ to the optical axis.

Meridional Plane

For a centered optical system the plane formed by the optical axis and the marginal ray is called by convention the meridional plane.

Chief Ray

According to the M. J. Kidger: "Fundamental Optical Design", SPIE Press, Bellingham, W A 2001, the chief ray is defined to be the ray from an off axis point in the object plane, passing through the center of the aperture stop. In the description used in this document, the chief ray of the outmost object field point is considered.

$H_C$

The chief ray from the outmost object field point has at every intersection point with an optical surface a distance $H_C$ to the optical axis.

Aperture Stop Proximity Space

The space around the aperture stop satisfying the relation $H_C/H_M<0.5$ is defined to be the aperture stop proximity space. A surface is said to lie within the aperture stop proximity space if $H_C/H_M<0.5$ for this particular surface. A lens is said to lie within the aperture stop proximity space if both surfaces of the lens lie within the aperture stop proximity space. Sometimes, only one of the surfaces of a lens lies within the aperture stop proximity space.

Field Proximity Space

The space in front and beyond the aperture stop proximity space is called to be the field proximity space. In other words, the field proximity space is the space satisfying the relation $H_C/H_M>=0.5$. Typically, there are field proximity spaces in an objective, one on the object side of the objective lens and one on the image side. A surface is said to lie within the field proximity space if $H_C/H_M>=0.5$ for this particular surface. A lens is said to lie within the field proximity space if both surfaces of the lens lie within the field proximity space. Sometimes, only one of the surfaces of a lens lies within the field proximity space, while the other may lie within the aperture stop proximity space.

Abnormal Glasses see anomalous dispersion glasses

Glass Material Classes

The names of the glass material classes are given in FIG. 14 as a function of the refractive index and the Abbe number.

Low Dispersion Glasses

Low dispersion glasses are glasses with an Abbe number $v_d$ of 62 or higher.

Anomalous Dispersion Glasses

Glasses with anomalous dispersion are defined as glasses whose departure from the normal line of the relative partial dispersion $\Delta P_{gF}$ is at least 0.005, in terms of absolute value.

Relative Partial Dispersion $P_{gF}$

The relative partial dispersion $P_{gF}$ of an optical glass is defined for the Fraunhofer wavelengths g and F as:

$$P_{gF} = \frac{n_g - n_F}{n_F - n_C}$$

In this equation $n_g$, $n_F$, $n_C$ are the refractive indices of the chosen glass at the Fraunhofer wavelengths g (422.670 nm), F (486.134 nm) and C (656.281 nm) correspondingly.

Departure from the Normal Line of the Relative Partial Dispersion $\Delta P_{gF}$

The departure of the relative partial dispersion $\Delta P_{gF}$ from the normal line of a chosen glass for the g and F Fraunhofer wavelengths is given by the equation:

$$\Delta P_{gF} = \frac{n_g - n_F}{n_F - n_C} - (0.6438 - 0.001682 * v_d)$$

In this equation $n_g$, $n_F$, $n_C$ are the refractive indices of the chosen glass at the Fraunhofer wavelengths g (422.670 nm), F (486.134 nm) and C (656.281 nm) correspondingly. $v_d$ is the Abbe number of the glass type at the Fraunhofer wavelengths d (466.814 nm).

GAR

The sum of the absolute values of all departures from the normal line of the relative partial dispersion of all lenses divided by the number of lenses and multiplied by 10^4 is called glass anomalous ratio (GAR):

$$GAR = \frac{\Sigma |\Delta P_{gF}|}{\text{number of lenses}} * 10^4$$

The GAR serves as indicator of the number of lenses with anomalous dispersion.

TABLE 6A

| Group | Lens | Surface | Radius/ mm | Separation/ mm | Type | Focus position | Diameter/ mm | $n_d$ | $V_d$ | exemplary glass type |
|---|---|---|---|---|---|---|---|---|---|---|
| | | Object | | infinity | plane | 1 | | | | 'AIR' |
| | | | | 1787.780 | | 2 | | | | |
| | | | | 487.430 | | 3 | | | | |
| LG1 | L1 | 124 | 181.452 | 6.748 | aspheric | all | 74.85 | 1.538 | 74.7 | SFPM3 |
| | | 2 | 31.934 | 18.820 | spherical | all | | | | 'AIR' |
| LG1 | L2 | 126 | −1065.096 | 3.490 | aspherical | all | 49.38 | 1.816 | 46.6 | SLAH59 |
| | | 4 | 45.167 | 14.867 | spherical | all | | | | 'AIR' |
| LG1 | L3 | 5 | −52.201 | 6.700 | spherical | all | 44.96 | 1.697 | 55.5 | SLAL14 |
| | | 6 | −90.530 | 0.250 | spherical | all | | | | 'AIR' |
| LG1 | L4 | 7 | −1088.862 | 5.044 | spherical | all | 49.74 | 1.738 | 32.3 | SNBH53 |
| | | 8 | −167.588 | 0.302 | spherical | 1 | | | | 'AIR' |
| | | | | 0.750 | | 2 | | | | |
| | | | | 1.734 | | 3 | | | | |
| LG2, LG21 | L5 | 9 | 178.802 | 3.000 | spherical | all | 51.08 | 1.785 | 25.7 | STIH11 |
| LG2, LG21 | L6 | 10 | 47.276 | 15.723 | spherical | all | 50.71 | 1.883 | 40.8 | SLAH58 |
| | | 11 | −165.556 | 18.999 | spherical | all | | | | 'AIR' |
| | | 12 | infinity | 18.540 | plane | all | 50.14 | | | 'AIR' |
| LG2, LG21 | L7 | 13 | 57.937 | 6.048 | spherical | all | 42.30 | 1.808 | 22.8 | SNPH1W |
| | | 14 | 189.235 | 2.895 | spherical | 1 | | | | 'AIR' |
| | | | | 2.383 | | 2 | | | | |
| | | | | 1.094 | | 3 | | | | |
| LG2, LG22 | L8 | 15 | 46.285 | 7.320 | spherical | all | 39.44 | 1.529 | 77.0 | NPK51 |
| | | 16 | 515.527 | 0.952 | spherical | all | | | | 'AIR' |
| LG2, LG22 | L9 | 17 | 159.948 | 3.930 | spheric al | all | 36.42 | 1.720 | 34.7 | NKZFS8 |
| LG2, LG22 | L10 | 18 | 23.601 | 9.783 | spherical | all | 31.55 | 1.439 | 95.0 | SFPL53 |
| | | 19 | −216.783 | 1.460 | spherical | 1 | | | | 'AIR' |
| | | | | 1.523 | | 2 | | | | |
| | | | | 1.829 | | 3 | | | | |
| | Stop | 114 | | 5.330 | plane | all | | | | 'AIR' |
| LG2 | L11 | 128 | −25.724 | 3.000 | aspherical | all | 28.69 | 1.620 | 36.3 | STIM2 |
| | | 22 | −723.014 | 1.633 | spherical | all | | | | 'AIR' |
| LG2 | L12 | 23 | −400.657 | 3.075 | spherical | all | 30.30 | 1.883 | 40.8 | SLAH58 |
| | | 130 | −128.898 | 2.347 | aspherical | all | | | | 'AIR' |
| LG2 | L13 | 25 | 96.634 | 11.009 | spherical | all | 37.22 | 1.595 | 67.7 | SFPM2 |
| | | 26 | −32.065 | 0.250 | spherical | all | | | | 'AIR' |
| LG2 | L14 | 27 | −89.040 | 3.000 | spherical | all | 39.10 | 1.883 | 40.8 | SLAH58 |
| LG2 | L15 | 28 | 127.582 | 10.849 | spheric | all | 40.79 | 1.439 | 95.0 | SFPL53 |
| | | 29 | −37.474 | 0.343 | spherical | all | | | | 'AIR' |
| | | 30 | infinity | 2.300 | plane | all | 42.43 | 1.517 | 64.2 | NBK7 |
| | | 31 | infinity | 37.993 | plane | all | | | | 'AIR' |
| | | Image | | | plane | all | | | | 'AIR' |

TABLE 6B

Aspherical constants

| | Surface | | | |
|---|---|---|---|---|
| | 124 | 126 | 128 | 130 |
| K | 0.000000E+00 | 0.000000E+00 | 0.000000E+00 | 0.000000E+00 |
| C1 | 2.928006E−06 | −1.665279E−06 | 3.430806E−05 | 2.465537E−05 |
| C2 | −1.193500E−09 | 6.907559E−10 | −5.532435E−08 | −1.955541E−08 |
| C3 | 8.731906E−13 | −3.840067E−13 | 4.894009E−11 | −4.319787E−12 |
| C4 | −3.799588E−16 | −9.568675E−17 | −2.128652E−15 | 1.263193E−14 |
| C5 | 1.016989E−19 | 0.000000E+00 | 0.000000E+00 | 0.000000E+00 |
| C6 | 0.000000E+00 | 0.000000E+00 | 0.000000E+00 | 0.000000E+00 |
| C7 | 0.000000E+00 | 0.000000E+00 | 0.000000E+00 | 0.000000E+00 |
| C8 | 0.000000E+00 | 0.000000E+00 | 0.000000E+00 | 0.000000E+00 |
| C9 | 0.000000E+00 | 0.000000E+00 | 0.000000E+00 | 0.000000E+00 |

TABLE 7

| Surface | Spherical aberration | Coma | Astigmatism | Distortion | |
|---|---|---|---|---|---|
| 124 | −0.00 | −0.01 | −0.31 | −3.59 | |
|  | −0.06 | 0.88 | −4.53 | 7.72 | Aspheric contribution |
| 2 | 0.13 | −0.66 | 1.91 | −1.95 | |
| 126 | −0.01 | −0.14 | −0.74 | −1.26 | |
|  | 0.12 | −0.93 | 2.41 | −2.09 | Aspheric contribution |
| 4 | 0.84 | −2.30 | 2.86 | −1.33 | |
| 5 | −0.00 | −0.07 | −1.14 | 0.20 | |
| 6 | 0.12 | 0.43 | 0.16 | −0.20 | |
| 7 | −0.56 | 0.18 | 0.01 | 0.00 | |
| 8 | 0.13 | 0.37 | 0.16 | −0.07 | |
| 9 | −0.75 | 0.60 | −0.34 | 0.06 | |
| 10 | −0.30 | 0.79 | −0.74 | 0.24 | |
| 11 | 0.00 | −0.03 | 0.17 | 0.95 | |
| 12 | 0 | 0 | 0.00 | 0.00 | |
| 13 | −0.87 | −0.68 | −0.75 | −0.17 | |
| 14 | −0.00 | 0.06 | −0.60 | 1.12 | |
| 15 | −0.06 | −0.13 | −0.66 | −0.46 | |
| 16 | −0.50 | 2.29 | −3.49 | 1.74 | |
| 17 | 0.29 | −1.72 | 3.18 | −1.83 | |

TABLE 7-continued

| Surface | Spherical aberration | Coma | Astigmatism | Distortion | |
|---|---|---|---|---|---|
| 18 | 0.61 | 0.52 | 0.50 | 0.12 | |
| 19 | −0.36 | 1.55 | −2.34 | 1.23 | |
| STO | 0 | 0 | 0.00 | 0.00 | |
| 128 | 3.64 | −5.11 | 3.50 | −0.89 | |
|  | −9.15 | −4.95 | −0.89 | −0.05 | Aspheric contribution |
| 22 | 0.00 | 0.05 | 0.57 | 1.81 | |
| 23 | −0.00 | −0.04 | −0.55 | −2.08 | |
| 130 | −0.01 | 0.09 | −0.64 | 1.62 | |
|  | 10.54 | 11.54 | 4.21 | 0.51 | Aspheric contribution |
| 25 | −0.02 | −0.18 | −0.97 | −1.98 | |
| 26 | −3.61 | −0.21 | −0.87 | −0.02 | |
| 27 | 1.37 | −1.45 | 0.91 | −0.20 | |
| 28 | −0.00 | 0.01 | −0.22 | 0.43 | |
| 29 | −1.53 | −0.73 | −0.72 | −0.10 | |
| 30 | 0.27 | −0.69 | 0.59 | −0.17 | |
| 31 | −0.26 | 0.67 | −0.57 | 0.16 | |
| SUM | 0.04 | 0.00 | 0.07 | −0.50 | |

TABLE 13A

| Group | Lens | Surface | Radius/ mm | Separation/ mm | Type | Focus position | Diameter/ mm | $n_d$ | $V_d$ | exemplary glass type |
|---|---|---|---|---|---|---|---|---|---|---|
|  |  | Object |  | infinity | plane | 1 |  |  |  | 'AIR' |
|  |  |  |  | 656.139 |  | 2 |  |  |  |  |
|  |  |  |  | 314.651 |  | 3 |  |  |  |  |
| LG1 | L1 | 524 | 76.210 | 5.576 | aspherical | all | 64.80 | 1.538 | 74.7 | SFPM3 |
|  |  | 2 | 40.916 | 8.303 | spherical | all |  |  |  | 'AIR' |
| LG1 | L2 | 3 | 80.079 | 4.000 | spherical | all | 52.61 | 1.800 | 44.2 | SLAH52 |
|  |  | 4 | 31.185 | 30.953 | spherical | all |  |  |  | 'AIR' |
| LG1 | L3 | 5 | −41.735 | 3.829 | spherical | all | 41.79 | 1.613 | 44.5 | NKZFS4 |
|  |  | 6 | −1251.683 | 0.250 | spherical | all |  |  |  | 'AIR' |
| LG1 | L4 | 7 | 153.175 | 8.211 | spherical | all | 45.91 | 1.816 | 46.6 | SLAH59 |
|  |  | 8 | −681.623 | 3.385 | spherical | 1 |  |  |  | 'AIR' |
|  |  |  |  | 4.570 | spherical | 2 |  |  |  |  |
|  |  |  |  | 5.655 | spherical | 3 |  |  |  |  |
| LG2, LG21 | L5 | 9 | −124.700 | 5.156 | spherical | all | 47 | 1.855 | 24.8 | SNBH56 |
| LG2, LG21 | L6 | 10 | 71.548 | 16.670 | spherical | all | 50.94 | 1.883 | 40.8 | SLAH58 |
|  |  | 11 | −71.789 | 0.435 | spherical | all |  |  |  | 'AIR' |
|  |  | 12 | infinity | 4.320 | plane | all | 53.25 |  |  | 'AIR' |
| LG2, LG21 | L7 | 13 | 72.300 | 8.984 | spherical | all | 53.37 | 1.808 | 22.8 | SNPH1W |
|  |  | 14 | 600.739 | 12.499 | spherical | 1 |  |  |  | 'AIR' |
|  |  |  |  | 7.037 | spherical | 2 |  |  |  |  |
|  |  |  |  | 1.696 | spherical | 3 |  |  |  |  |
| LG2, LG22 | L8 | 15 | 60.041 | 7.438 | spherical | all | 44.72 | 1.497 | 81.6 | SFPL51 |
|  |  | 16 | 149.182 | 0.250 | spherical | all |  |  |  | 'AIR' |
| LG2, LG22 | L9 | 17 | 91.930 | 3.000 | spherical | all | 42.45 | 1.654 | 39.7 | NKZFS5 |
| LG2, LG22 | L10 | 18 | 34.107 | 7.997 | spherical | all | 39.43 | 1.497 | 81.6 | SFPL51 |
|  |  | 19 | 61.872 | 5.533 | spherical | 1 |  |  |  | 'AIR' |
|  |  |  |  | 9.812 | spherical | 2 |  |  |  |  |
|  |  |  |  | 14.066 | spherical | 3 |  |  |  |  |
|  | Stop | 514 |  | 6.508 | plane | all |  |  |  | 'AIR' |
| LG2 | L11 | 21 | −45.690 | 3.000 | spherical | all | 36.68 | 1.883 | 40.8 | SLAH58 |
|  |  | 526 | −136.662 | 0.250 | aspherical | all |  |  |  | 'AIR' |
| LG2 | L12 | 23 | 44.010 | 14.317 | spherical | all | 41.51 | 1.595 | 67.7 | SFPM2 |
|  |  | 528 | −41.911 | 2.310 | aspherical | all |  |  |  | 'AIR' |
| LG2 | L13 | 25 | −126.648 | 3.000 | spherical | all | 36.89 | 1.883 | 40.8 | SLAH58 |
| LG2 | L14 | 26 | 31.472 | 14.825 | spherical | all | 34.73 | 1.497 | 81.6 | 5FPL51 |
|  |  | 27 | −40.583 | 4.454 | spherical | all |  |  |  | 'AIR' |
|  |  | 28 | infinity | 2.300 | plane | all | 35.31 | 1.517 | 64.2 | NBK7 |
|  |  | 29 | infinity | 47.594 | plane | all |  |  |  | 'AIR' |
|  |  | Image |  |  | plane |  |  |  |  | 'AIR' |

TABLE 13B

Aspherical constants

| | Surface | | |
|---|---|---|---|
| | 524 | 526 | 528 |
| K | −1.668340E+01 | 0.000000E+00 | 0.000000E+00 |
| C1 | 5.545102E−06 | 3.328450E−06 | 4.521731E−06 |
| C2 | −4.037194E−09 | 1.050201E−09 | −7.444028E−10 |
| C3 | 3.519854E−12 | −1.814281E−13 | 4.046920E−12 |
| C4 | −1.754861E−15 | −3.249855E−15 | −2.227990E−15 |
| C5 | 4.040430E−19 | 0.000000E+00 | 0.000000E+00 |
| C6 | 0.000000E+00 | 0.000000E+00 | 0.000000E+00 |
| C7 | 0.000000E+00 | 0.000000E+00 | 0.000000E+00 |
| C8 | 0.000000E+00 | 0.000000E+00 | 0.000000E+00 |
| C9 | 0.000000E+00 | 0.000000E+00 | 0.000000E+00 |

TABLE 14

| Surface | Spherical aberration | Coma | Astigmatism | Distortion | |
|---|---|---|---|---|---|
| 524 | −0.01 | −0.06 | −0.46 | −0.77 | |
| | −0.06 | 0.56 | −1.61 | 1.54 | Aspherical contribution |
| 2 | 0.13 | −0.16 | 0.71 | −0.27 | |
| 3 | −0.05 | −0.18 | −0.64 | −0.64 | |
| 4 | 1.22 | −2.87 | 3.32 | −1.43 | |
| 5 | −0.04 | 0.34 | −0.29 | −1.02 | |
| 6 | 1.71 | 0.42 | 0.01 | 0.00 | |
| 7 | −3.64 | 1.17 | −0.34 | 0.03 | |
| 8 | 0.74 | 0.95 | 0.35 | 0.04 | |
| 9 | −0.20 | −0.77 | −0.69 | −0.06 | |
| 10 | −0.29 | 0.24 | −0.08 | 0.01 | |
| 11 | 0.03 | −0.14 | −0.26 | 0.65 | |
| 12 | 0.00 | 0.00 | 0.00 | 0.00 | |
| 13 | −2.49 | −0.35 | −0.48 | −0.02 | |
| 14 | −0.02 | 0.22 | −0.72 | 0.73 | |
| 15 | −0.09 | −0.18 | −0.53 | −0.30 | |
| 16 | −0.04 | 0.36 | −0.97 | 0.68 | |
| 17 | 0.00 | 0.01 | 0.63 | −0.70 | |
| 18 | 0.22 | 0.18 | 0.19 | 0.04 | |
| 19 | −0.01 | −0.04 | 0.34 | 0.60 | |
| STO | 0.00 | 0.00 | 0.00 | 0.00 | |
| 21 | 2.15 | −3.25 | 2.41 | −0.66 | |
| 526 | 0.00 | −0.05 | 0.13 | 0.96 | |
| | 5.72 | 2.43 | 0.34 | 0.02 | Aspherical contribution |
| 23 | −1.57 | −3.66 | −3.48 | −1.23 | |
| 528 | −7.87 | 2.79 | −1.00 | 0.09 | |
| | 3.83 | 3.63 | 1.15 | 0.12 | Aspherical contribution |
| 25 | 3.00 | −3.02 | 1.29 | −0.21 | |
| 26 | 0.54 | 1.60 | 1.91 | 0.84 | |
| 27 | −2.94 | −0.22 | −0.62 | −0.02 | |
| 28 | 0.33 | −0.82 | 0.66 | −0.18 | |
| 29 | −0.32 | 0.79 | −0.64 | 0.17 | |
| SUM | −0.02 | −0.10 | 0.63 | −0.97 | |

TABLE 20A

| Group | Lens | Surface | Radius/mm | Separation/mm | Type | Focus position | Diameter/mm | $n_d$ | $V_d$ | exemplary glass type |
|---|---|---|---|---|---|---|---|---|---|---|
| | | Object | infinity | infinity | plane | 1 | | | | 'AIR' |
| | | | | 572.659 | | 2 | | | | |
| | | | | 319.083 | | 3 | | | | |
| LG1 | L1 | 824 | 227.897 | 5.166 | aspherical | all | 70.72 | 1.497 | 81.6 | SFPL51 |
| | | 2 | 45.953 | 5.031 | spherical | all | | | | 'AIR' |
| LG1 | L2 | 826 | 40.509 | 8.973 | aspherical | all | 56.43 | 1.804 | 39.6 | SLAH63 |
| | | 4 | 28.056 | 25.580 | spherical | all | | | | 'AIR' |
| LG1 | L3 | 5 | −39.464 | 7.449 | spherical | all | 40.13 | 1.558 | 54.0 | NKZFS2 |
| LG1 | L4 | 6 | 58.346 | 7.166 | spherical | all | 43.34 | 1.816 | 46.6 | SLAH59 |
| | | 7 | −4208.834 | 4.525 | spherical | 1 | | | | 'AIR' |
| | | | | 6.279 | spherical | 2 | | | | |
| | | | | 7.338 | spherical | 3 | | | | |
| LG2, LG21 | L5 | 8 | −98.648 | 5.898 | spherical | all | 43.62 | 1.855 | 24.8 | SNBH56 |
| LG2, LG21 | L6 | 9 | 71.210 | 13.988 | spherical | all | 46.64 | 1.883 | 40.8 | SLAH58 |
| | | 10 | −69.363 | 0.250 | spherical | all | | | | 'AIR' |
| | | 11 | infinity | 14.641 | plane | all | | | | 'AIR' |
| LG2, LG21 | L7 | 12 | 81.330 | 8.866 | spherical | all | 52.69 | 1.808 | 22.8 | SNPH1W |
| | | 13 | −9696.883 | 8.909 | spherical | 1 | | | | 'AIR' |
| | | | | 5.097 | spherical | 2 | | | | |
| | | | | 2.181 | spherical | 3 | | | | |
| LG2, LG22 | L8 | 14 | 57.031 | 7.644 | spherical | all | 48.21 | 1.538 | 74.7 | SFPM3 |
| | | 15 | 162.892 | 1.278 | spherical | all | | | | 'AIR' |
| LG2, LG22 | L9 | 16 | 89.664 | 4.000 | spherical | all | 44.77 | 1.720 | 34.7 | NKZFS8 |
| LG2, LG22 | L10 | 17 | 29.768 | 14.891 | spherical | all | 39.78 | 1.497 | 81.6 | SFPL51 |
| | | 18 | 83.576 | 3.960 | spherical | 1 | | | | 'AIR' |
| | | | | 6.019 | spherical | 2 | | | | |
| | | | | 7.876 | spherical | 3 | | | | |
| | Stop | 814 | infinity | 5.840 | plane | all | | | | 'AIR' |
| LG2 | L11 | 20 | −40.464 | 3.000 | spherical | all | 34.41 | 1.883 | 40.8 | SLAH58 |
| | | 828 | −101.968 | 0.250 | aspherical | all | | | | 'AIR' |
| LG2 | L12 | 22 | 69.590 | 9.613 | spherical | all | 37.09 | 1.595 | 67.7 | SFPM2 |
| | | 23 | −45.417 | 0.250 | spherical | all | | | | 'AIR' |
| LG2 | L13 | 24 | 368.632 | 3.000 | spherical | all | 34.80 | 1.883 | 40.8 | SLAH58 |
| LG2 | L14 | 25 | 36.199 | 10.833 | spherical | all | 34.35 | 1.439 | 95.0 | SFPL53 |

TABLE 20A-continued

| Group | Lens | Surface | Radius/ mm | Separation/ mm | Type | Focus position | Diameter/ mm | $n_d$ | $V_d$ | exemplary glass type |
|---|---|---|---|---|---|---|---|---|---|---|
| | | 26 | −46.824 | 1.008 | spherical | all | | | | 'AIR' |
| | | 27 | infinity | 2.300 | plane | all | 36.06 | 1.517 | 64.2 | NBK7 |
| | | 28 | infinity | 46.609 | plane | all | | | | 'AIR' |
| | | Image | | | plane | all | | | | 'AIR' |

TABLE 20B

Aspherical constants

| | Surface | | |
|---|---|---|---|
| | 824 | 826 | 828 |
| K | 3.443700E+01 | 0.000000E+00 | 0.000000E+00 |
| C1 | 5.059106E−06 | −3.761787E−06 | 4.214330E−06 |
| C2 | −3.942643E−09 | 7.471088E−10 | 1.314932E−09 |
| C3 | 3.258342E−12 | −4.496700E−13 | 6.662541E−13 |
| C4 | −1.597597E−15 | −1.508576E−15 | −1.036041E−16 |
| C5 | 4.421237E−19 | 0.000000E+00 | 0.000000E+00 |
| C6 | 0.000000E+00 | 0.000000E+00 | 0.000000E+00 |
| C7 | 0.000000E+00 | 0.000000E+00 | 0.000000E+00 |
| C8 | 0.000000E+00 | 0.000000E+00 | 0.000000E+00 |
| C9 | 0.000000E+00 | 0.000000E+00 | 0.000000E+00 |

TABLE 21

| Surface | Spherical aberration | Coma | Astigmatism | Distortion | |
|---|---|---|---|---|---|
| 824 | 0.00 | −0.01 | −0.24 | −1.70 | |
| | −0.39 | 3.83 | −12.43 | 13.46 | Aspherical contribution |
| 2 | 0.16 | −0.42 | 0.91 | −0.59 | |
| 826 | −0.27 | 0.74 | −1.49 | 0.95 | |
| | 0.51 | −4.13 | 11.22 | −10.15 | Aspherical contribution |

TABLE 21-continued

| Surface | Spherical aberration | Coma | Astigmatism | Distortion | |
|---|---|---|---|---|---|
| 4 | 0.90 | −3.01 | 4.54 | −2.56 | |
| 5 | −0.01 | 0.13 | 0.19 | −1.84 | |
| 6 | −1.00 | 1.57 | −0.94 | 0.20 | |
| 7 | 0.47 | 0.57 | 0.22 | 0.03 | |
| 8 | −0.05 | −0.42 | −0.74 | −0.05 | |
| 9 | −0.19 | 0.26 | −0.12 | 0.02 | |
| 10 | 0.03 | −0.21 | −0.03 | 0.78 | |
| 11 | 0.00 | 0.00 | 0.00 | 0.00 | |
| 12 | −1.59 | −0.23 | −0.42 | −0.02 | |
| 13 | −0.04 | 0.32 | −0.94 | 0.93 | |
| 14 | −0.13 | −0.21 | −0.56 | −0.25 | |
| 15 | −0.06 | 0.53 | −1.32 | 0.94 | |
| 16 | 0.00 | −0.05 | 0.81 | −0.91 | |
| 17 | 0.48 | 0.22 | 0.25 | 0.03 | |
| 18 | 0.00 | −0.07 | −0.25 | 0.85 | |
| STO | 0.00 | 0.00 | 0.00 | 0.00 | |
| 20 | 2.01 | −3.43 | 2.80 | −0.85 | |
| 828 | 0.00 | 0.03 | −0.44 | 1.18 | |
| | 3.91 | 2.04 | 0.35 | 0.02 | Aspherical contribution |
| 22 | −0.19 | −0.91 | −1.81 | −1.36 | |
| 23 | −3.24 | 2.82 | −1.42 | 0.25 | |
| 24 | 0.40 | −1.47 | 1.70 | −0.61 | |
| 25 | 0.12 | 0.48 | 0.96 | 0.71 | |
| 26 | −1.85 | 0.96 | −0.65 | 0.09 | |
| 27 | 0.33 | −0.98 | 0.96 | −0.32 | |
| 28 | −0.32 | 0.95 | −0.93 | 0.31 | |
| SUM | −0.03 | −0.11 | 0.18 | −0.47 | |

TABLE 27A

| Group | Lens | Surface | Radius/ mm | Separation/ mm | Type | Focus position | Diameter/ mm | $n_d$ | $V_d$ | exemplary glass type |
|---|---|---|---|---|---|---|---|---|---|---|
| | | Object | infinity | infinity | plane | 1 | | | | 'AIR' |
| | | | | 1002 | | 2 | | | | |
| | | | | 242 | | 3 | | | | |
| LG1 | L1 | 1 | 85.273 | 8.165 | spherical | all | 58.97 | 1.497 | 81.6 | SFPL51 |
| | | 2 | 31.962 | 16.771 | spherical | all | | | | 'AIR' |
| LG1 | L2 | 1124 | −112.603 | 3.614 | aspherical | all | 46.78 | 1.552 | 63.5 | NPSK3 |
| | | 4 | 63.407 | 5.130 | spherical | all | | | | 'AIR' |
| LG1 | L3 | 5 | 190.386 | 17.439 | spherical | all | 48.80 | 1.883 | 40.8 | SLAH58 |
| LG1 | L4 | 6 | −30.591 | 3.474 | spherical | all | 40.50 | 1.738 | 32.3 | SNBH53 |
| | | 7 | 1056.449 | 7.570 | spherical | all | | | | 'AIR' |
| LG1 | L5 | 8 | infinity | 9.995 | spherical | all | 46.52 | 1.893 | 20.4 | SNPH4 |
| | | 9 | −265.206 | 0.250 | spherical | all | | | | 'AIR' |
| | | 10 | infinity | 16.593 | spherical | 1 | 49.00 | | | 'AIR' |
| | | | | 17.080 | spherical | 2 | | | | |
| | | | | 18.865 | spherical | 3 | | | | |
| LG2, LG21 | L6 | 11 | 902.828 | 10.561 | spherical | all | 54.03 | 1.529 | 77.0 | NPK51 |
| | | 12 | −56.489 | 6.804 | spherical | 1 | | | | 'AIR' |
| | | | | 5.085 | spherical | 2 | | | | |
| | | | | 0.250 | spherical | 3 | | | | |
| LG2, LG22 | L7 | 13 | −87.822 | 3.000 | spherical | all | 51.19 | 1.558 | 54.0 | NKZFS2 |
| | | 14 | −381.144 | 0.941 | spherical | all | | | | 'AIR' |
| LG2, LG22 | L8 | 15 | 62.485 | 17.908 | spherical | all | 50.84 | 1.497 | 81.6 | SFPL51 |

TABLE 27A-continued

| Group | Lens | Surface | Radius/ mm | Separation/ mm | Type | Focus position | Diameter/ mm | $n_d$ | $V_d$ | exemplary glass type |
|---|---|---|---|---|---|---|---|---|---|---|
| LG2, LG22 | L9 | 16 | −37.662 | 3.000 | spherical | all | 41.28 | 1.558 | 54.0 | NKZFS2 |
| | | 17 | −65.962 | −0.345 | spherical | all | | | | 'AIR' |
| | Stop | 1114 | infinity | 5.836 | spherical | all | | | | 'AIR' |
| LG2, LG22 | L10 | 1126 | −153.130 | 8.436 | aspherical | all | 37.50 | 1.638 | 42.4 | NKZFS11 |
| | | 20 | 50.990 | 8.541 | spherical | all | | | | 'AIR' |
| LG2, LG22 | L11 | 21 | 89.336 | 10.839 | spherical | all | 40.29 | 1.595 | 67.7 | SFPM2 |
| | | 22 | −40.170 | 0.250 | spherical | 1 | | | | 'AIR' |
| | | | | 1.482 | spherical | 2 | | | | |
| | | | | 4.532 | spherical | 3 | | | | |
| LG2 | L12 | 23 | 121.756 | 3.000 | spherical | all | 38 | 1.638 | 42.4 | NKZFS11 |
| LG2 | L13 | 24 | 32.784 | 4.722 | spherical | all | 36.04 | 1.497 | 81.6 | SFPL51 |
| | | 25 | 39.036 | 8.508 | spherical | all | | | | 'AIR' |
| LG2 | L14 | 1128 | −76.501 | 3.996 | aspherical | all | 35.81 | 1.883 | 40.8 | SLAH58 |
| | | 27 | −64.470 | 0.250 | spherical | all | | | | 'AIR' |
| | | 28 | infinity | 2.300 | spherical | all | 37.48 | 1.517 | 64.2 | NBK7 |
| | | 29 | infinity | 37.500 | spherical | all | | | | 'AIR' |
| | | Image | infinity | 0.000 | spherical | all | | | | 'AIR' |

TABLE 27B

Aspherical constants

| | Surface | | |
|---|---|---|---|
| | 1124 | 1126 | 1128 |
| K | 0.000000E+00 | 0.000000E+00 | 0.000000E+00 |
| C1 | −1.407725E−06 | −6.499083E−06 | −8.597449E−07 |
| C2 | −5.810684E−10 | −1.535750E−09 | 9.864617E−10 |
| C3 | −6.267993E−13 | 2.980041E−13 | −2.405687E−12 |
| C4 | −6.321127E−16 | 1.058766E−16 | 1.544049E−15 |
| C5 | 0.000000E+00 | 0.000000E+00 | 0.000000E+00 |
| C6 | 0.000000E+00 | 0.000000E+00 | 0.000000E+00 |
| C7 | 0.000000E+00 | 0.000000E+00 | 0.000000E+00 |
| C8 | 0.000000E+00 | 0.000000E+00 | 0.000000E+00 |
| C9 | 0.000000E+00 | 0.000000E+00 | 0.000000E+00 |

TABLE 28

| Surface | Spherical | Coma | Astigmatism | Distortion | |
|---|---|---|---|---|---|
| 1 | −0.03 | −0.08 | −0.37 | −0.33 | |
| 2 | 1.27 | −2.68 | 2.66 | −0.99 | |
| 1124 | 0.00 | 0.02 | −0.42 | −0.70 | |
| | 0.70 | −2.21 | 2.32 | −0.81 | Aspheric contribution |
| 4 | 2.85 | −2.92 | 1.42 | −0.26 | |
| 5 | −1.77 | 0.43 | −0.22 | 0.02 | |
| 6 | −0.71 | 2.21 | −2.39 | 0.90 | |
| 7 | 0.20 | 0.49 | 0.44 | 0.14 | |
| 8 | −0.18 | −0.53 | −0.52 | −0.17 | |
| 9 | 0.00 | 0.03 | 0.35 | 0.45 | |
| 10 | 0.00 | 0.00 | 0.00 | 0.00 | |
| 11 | −0.05 | −0.25 | −0.43 | −0.26 | |
| 12 | −3.17 | 6.47 | −4.86 | 1.31 | |
| 13 | 1.25 | −3.01 | 2.72 | −0.89 | |
| 14 | −0.01 | 0.11 | −0.40 | 0.53 | |
| 15 | −0.42 | −0.69 | −0.78 | −0.29 | |
| 16 | 1.06 | −0.92 | 0.32 | −0.04 | |
| 17 | −5.56 | 7.05 | −3.39 | 0.59 | |
| STO | 0.00 | 0.00 | 0.00 | 0.00 | |
| 1126 | 2.30 | −3.96 | 2.46 | −0.54 | |
| | 8.63 | 2.30 | 0.20 | 0.01 | Aspheric contribution |
| 20 | 0.12 | 0.49 | 1.27 | 1.15 | |
| 21 | 0.00 | −0.03 | −0.41 | −1.10 | |
| 22 | −6.97 | −0.67 | −0.71 | −0.02 | |
| 23 | 0.57 | −1.46 | 1.02 | −0.16 | |
| 24 | −0.01 | −0.09 | −0.08 | 0.13 | |
| 25 | −0.01 | −0.24 | −0.78 | 0.98 | |

TABLE 28-continued

| Surface | Spherical | Coma | Astigmatism | Distortion | |
|---|---|---|---|---|---|
| 1128 | 0.82 | −0.82 | 0.73 | −0.18 | |
| | 0.19 | 0.58 | 0.59 | 0.20 | Aspheric contribution |
| 27 | −1.07 | 0.41 | −0.59 | 0.07 | |
| 28 | 0.27 | −0.71 | 0.63 | −0.18 | |
| 29 | −0.26 | 0.68 | −0.60 | 0.18 | |
| SUM | 0.01 | −0.01 | 0.17 | −0.28 | |

REFERENCES

108 optical axis
110 marginal ray
112 chief ray
114 aperture stop
118 aperture stop proximity space
120 object side field proximity space
122 image side field proximity space
124 aspherical surface
126 aspherical surface
128 aspherical surface
130 aspherical surface
508 optical axis
510 marginal ray
512 chief ray
514 aperture stop
518 aperture stop proximity space
520 object side field proximity space
522 image side field proximity space
524 aspherical surface
526 aspherical surface
528 aspherical surface
808 optical axis
810 marginal ray
812 chief ray
814 aperture stop
818 aperture stop proximity space
820 object side field proximity space
822 image side field proximity space
824 aspherical surface
826 aspherical surface
828 aspherical surface 1108 optical axis
1110 marginal ray
1112 chief ray
1114 aperture stop
1118 aperture stop proximity space
1120 object side field proximity space
1122 image side field proximity space
1124 aspherical surface
1126 aspherical surface
1128 aspherical surface
$H_M$ marginal ray height
$H_C$ chief ray height

REFERENCES CITED

Patent Literature

U.S. Pat. No. 7,446,944 B2
U.S. Pat. No. 8,508,864 B2

Non-Patent Literature

I. Neil: "High performance wide angle objective lens systems with internal focusing optics and multiple aspheric surface for the visible waveband", SPIE VOL 2774, p. 216-242

The invention claimed is:

1. A fixed focal length objective lens forming an image of an object comprising:
a plurality of lens elements; and
an aperture stop defining an aperture stop proximity space and at least one field proximity space;
wherein at least three of the lens elements each have at most one aspherical surface;
wherein either:
two lens elements with an aspherical surface are positioned in the aperture stop proximity space and at least one of the other lens elements with an aspherical surface is positioned in the at least one field proximity space, or
at least one of the lens elements with an aspherical surface is positioned in the aperture stop proximity space and two lens elements with an aspherical surface are positioned in the at least one field proximity space;
wherein a marginal ray has at every intersection point with an optical surface a distance HM to the optical axis;
wherein a chief ray from the outmost object field point has at every intersection point with an optical surface a distance HC to the optical axis; and
wherein the ratio HC/HM is larger than or equal to 2 at the position of at least one of the lens elements with an aspherical surface in the field proximity space.

2. The objective lens according to claim 1, wherein
the ratio HC/HM is larger than 2.5 at the position of at least one of the lens elements with an aspherical surface in the field proximity space.

3. The objective lens according to claim 2, wherein
the ratio HC/HM is larger than 4 for at least one lens element with an aspherical surface in the field proximity space.

4. The objective lens according to claim 1, wherein
the ratio HC/HM is smaller than 0.4 at the position of the at least one lens element with an aspherical surface in the aperture stop proximity space.

5. The objective lens according to claim 1, wherein the plurality of lens elements includes:
a fixed first lens group of negative refracting power at the object side;
a second lens group of positive refracting power following the first lens group in this order coming from the object side;
wherein the aperture stop is located in the positive lens group; and
wherein the positive lens group comprises at least two sub lens groups for focusing the image for different object distances.

6. The objective lens according to claim 5, wherein
the first lens element of the second lens group is moving for focusing.

7. The objective lens according to claim 5, wherein
at least one of the fixed first lens group or the second lens group comprises two of the lens elements with an aspherical surface.

8. The objective lens according to claim 7, wherein
the two lens elements are positioned adjacent to one another.

9. The objective lens according to claim 5, wherein
the fixed first lens group having negative refractive power comprises at least two negative lens elements.

10. The objective lens according to claim 9, wherein
at least one of the negative lenses has a meniscus shape oriented with the convex side toward the object.

11. The objective lens according to claim 5, wherein
two of the lens elements with an aspherical surface are positioned in the first group.

12. The objective lens according to claim 11, wherein
the two lens elements with an aspherical surface each have a first surface with the aspherical shape on the object side.

13. The objective lens according to claim 5, wherein
the fixed first lens group includes two meniscus lenses first in order on the object side.

14. The objective lens according to claim 13, wherein
a first lens of the two meniscus lenses is one of the lenses having an aspherical surface and has the aspherical surface on the object side.

15. The objective lens according to claim 1, wherein
a glass anomalous ratio for the plurality of lens elements is larger or equal to 100.

16. The objective lens according to claim 1, wherein
a glass anomalous ratio for the plurality of lens elements is larger or equal to 100 and smaller or equal to 300.

17. The objective lens according to claim 1, wherein
a glass anomalous ratio for the plurality of lens elements is between 125 and 175.

18. The objective lens according to claim 1, wherein
for the lens elements in the aperture stop proximity space at least one positive powered lens is made of glass of a glass type consisting of fluorite crown.

19. The objective lens according to claim 1, wherein
for the lenses in the aperture stop proximity space at least one negative powered lens is made of glass of a glass type consisting of special short flint.

20. The objective lens according to claim 1, wherein
for the lenses in the field proximity space at least one lens is made of a low dispersion abnormal glass.

21. The objective lens according to claim 1, wherein
four lens elements include an aspherical surface.

* * * * *